May 8, 1945.   J. W. BRYCE   2,375,277
COMBINED MULTIPLYING AND DIVIDING MACHINE
Filed Feb. 11, 1942   19 Sheets-Sheet 2
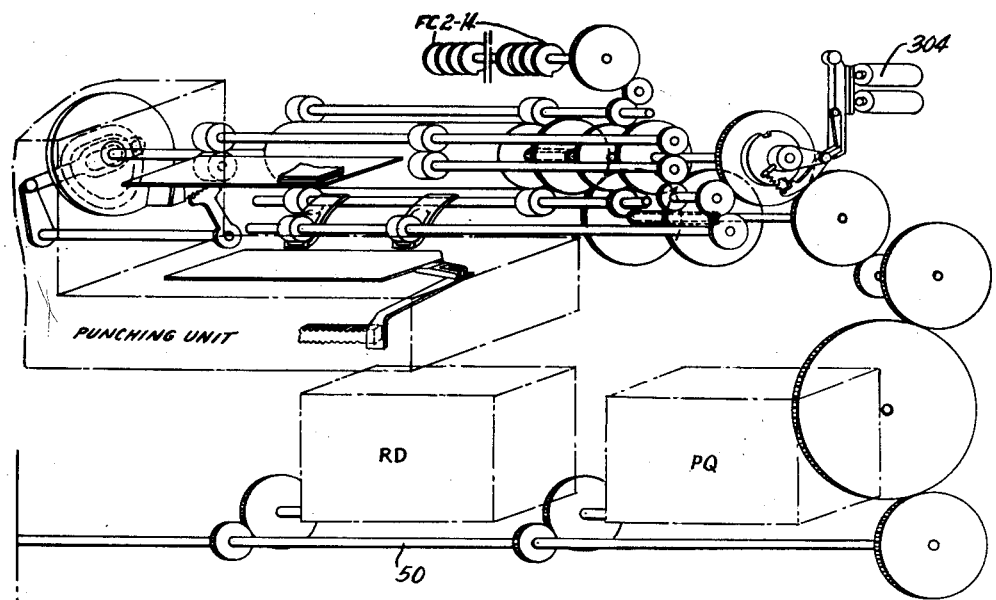
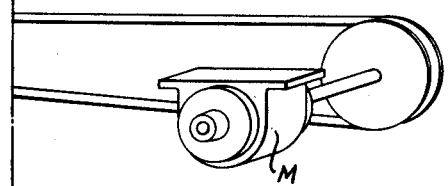
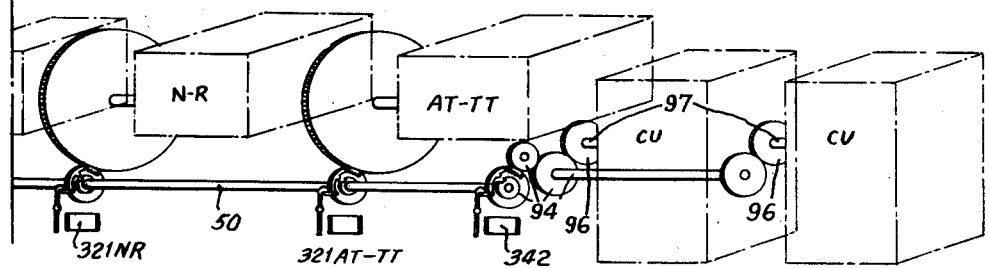
FIG.1 a.
INVENTOR.
James W. Bryce
BY
ATTORNEY

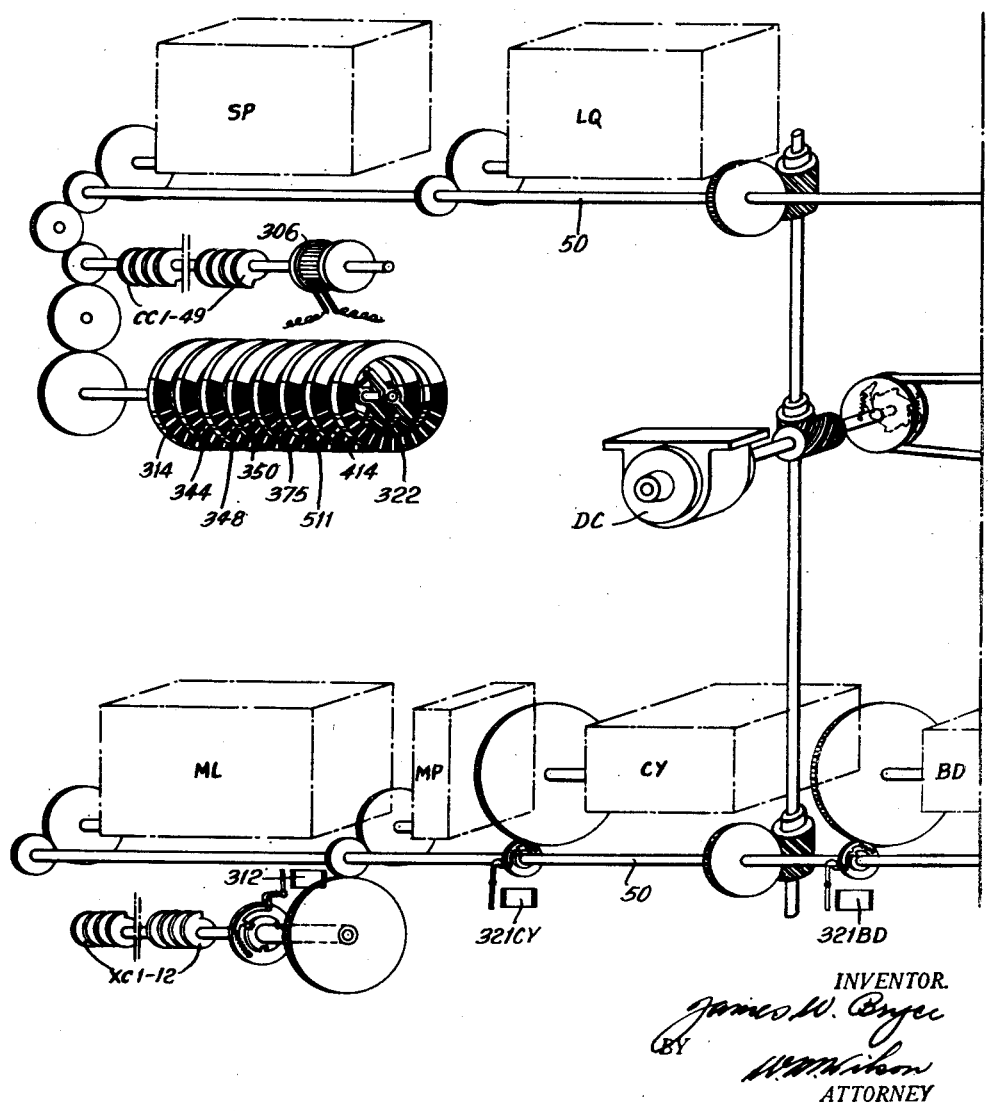

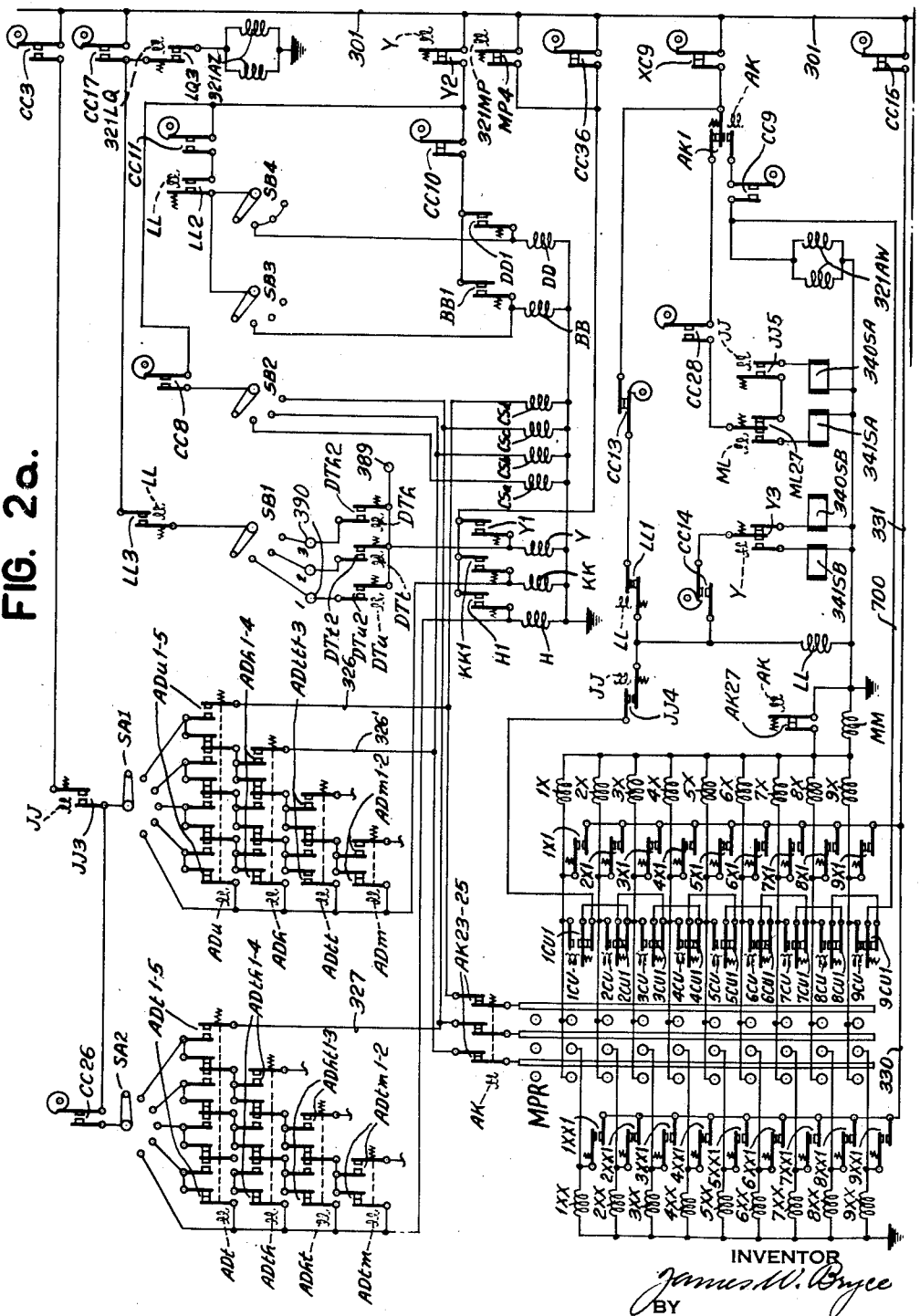

May 8, 1945.  J. W. BRYCE  2,375,277
COMBINED MULTIPLYING AND DIVIDING MACHINE
Filed Feb. 11, 1942   19 Sheets-Sheet 4

FIG. 2b.

May 8, 1945. J. W. BRYCE 2,375,277
COMBINED MULTIPLYING AND DIVIDING MACHINE
Filed Feb. 11, 1942 19 Sheets-Sheet 5

INVENTOR
James W. Bryce
BY
W. P. Wilson
ATTORNEY

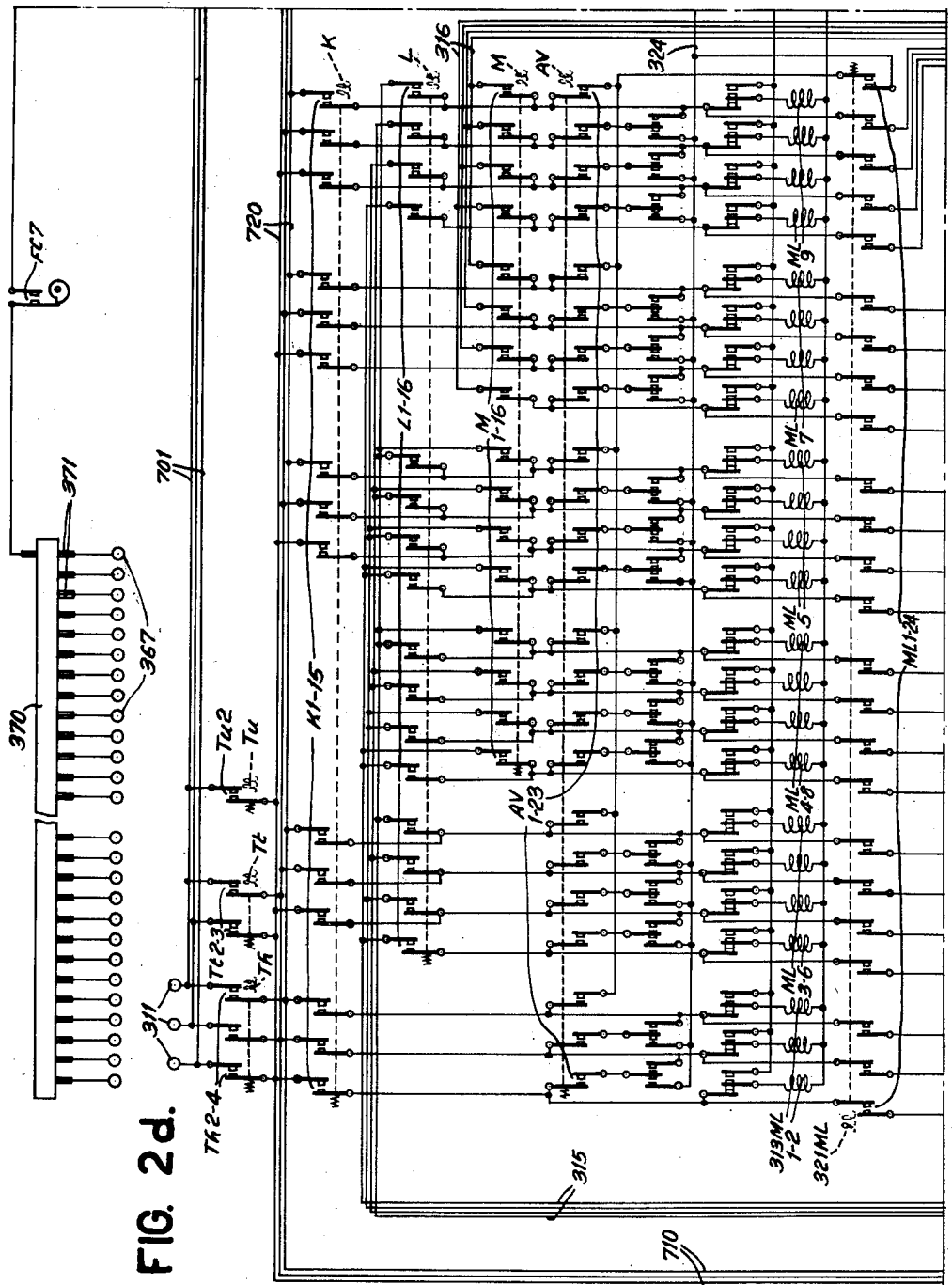

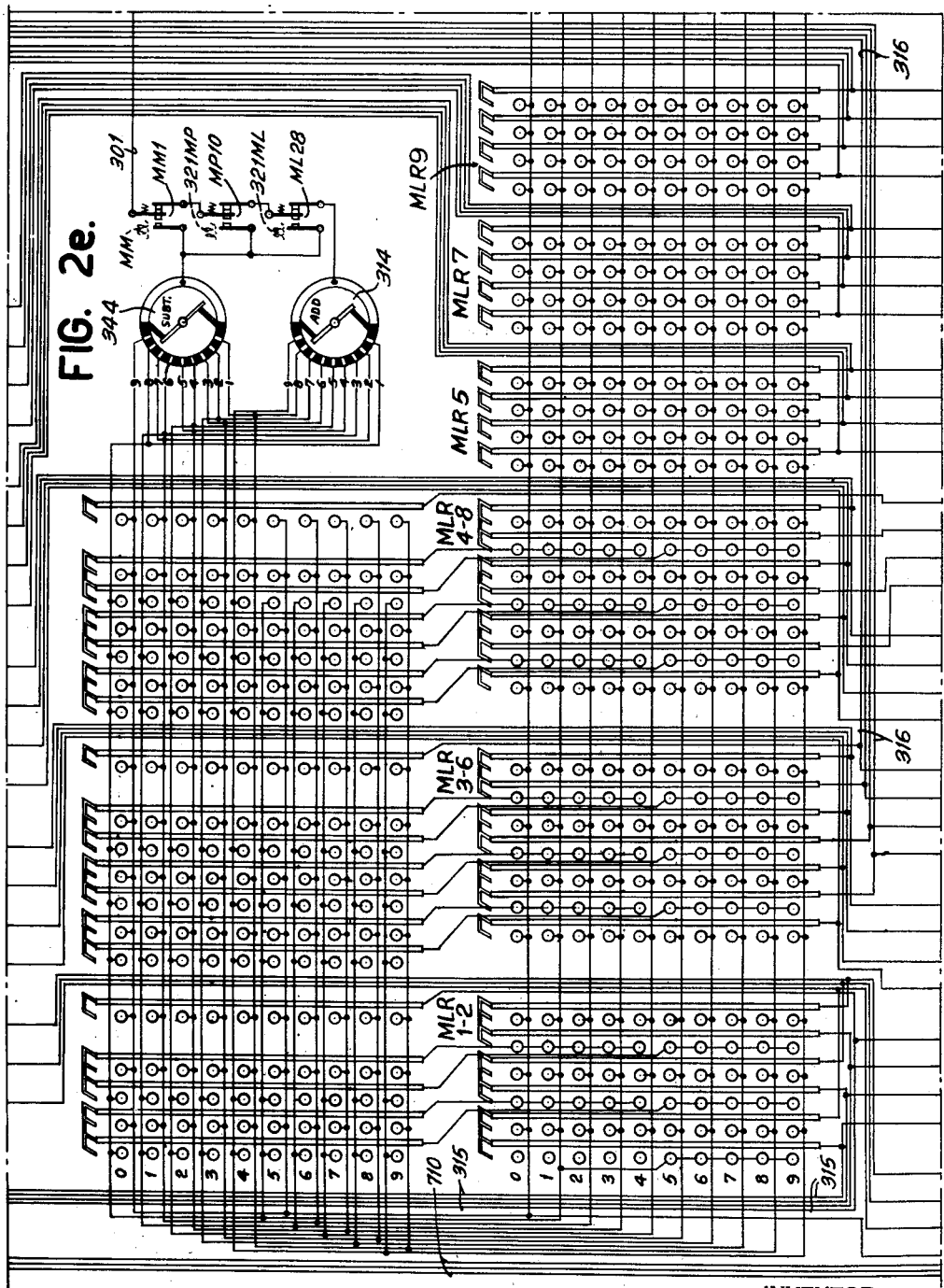

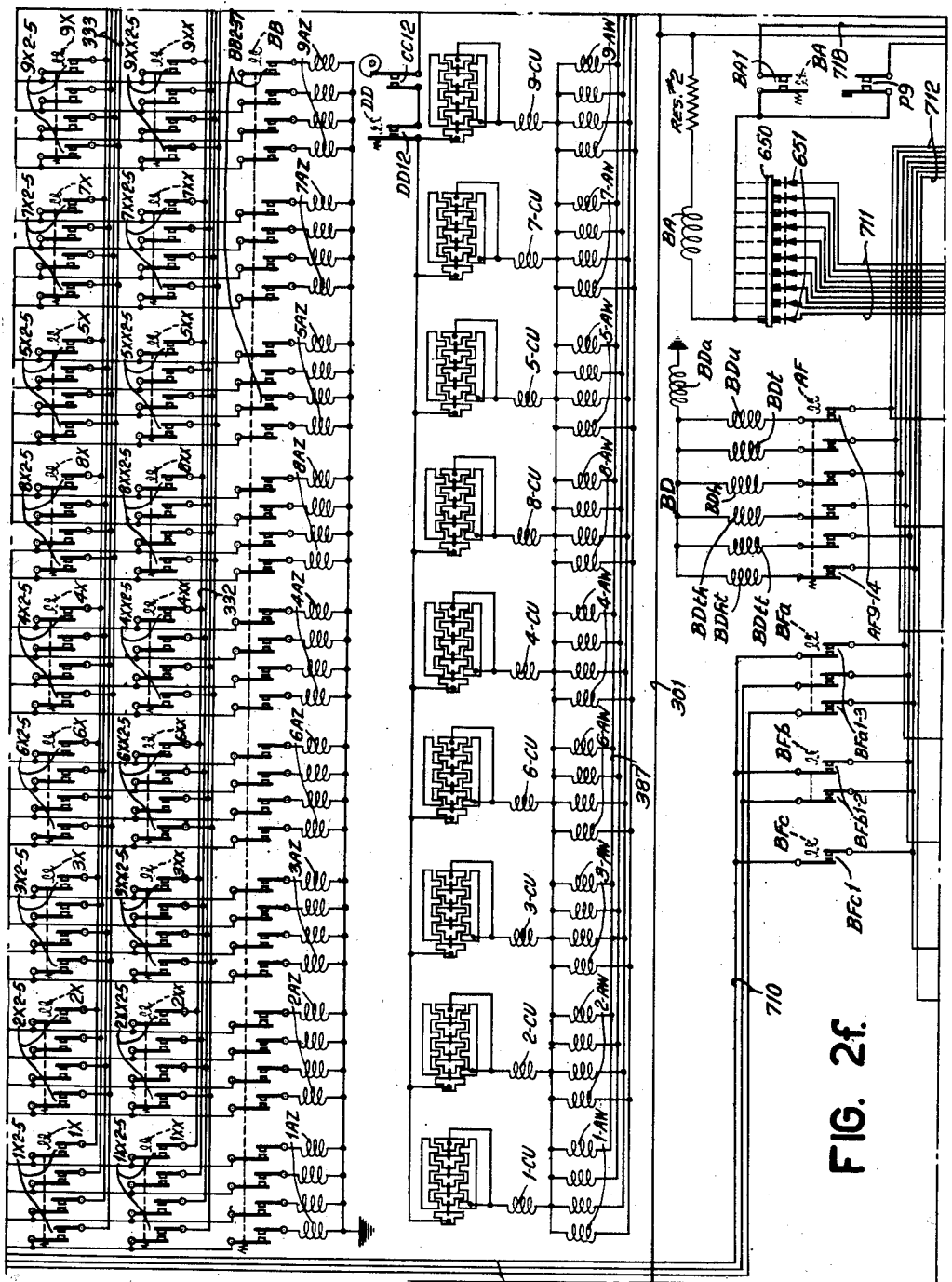

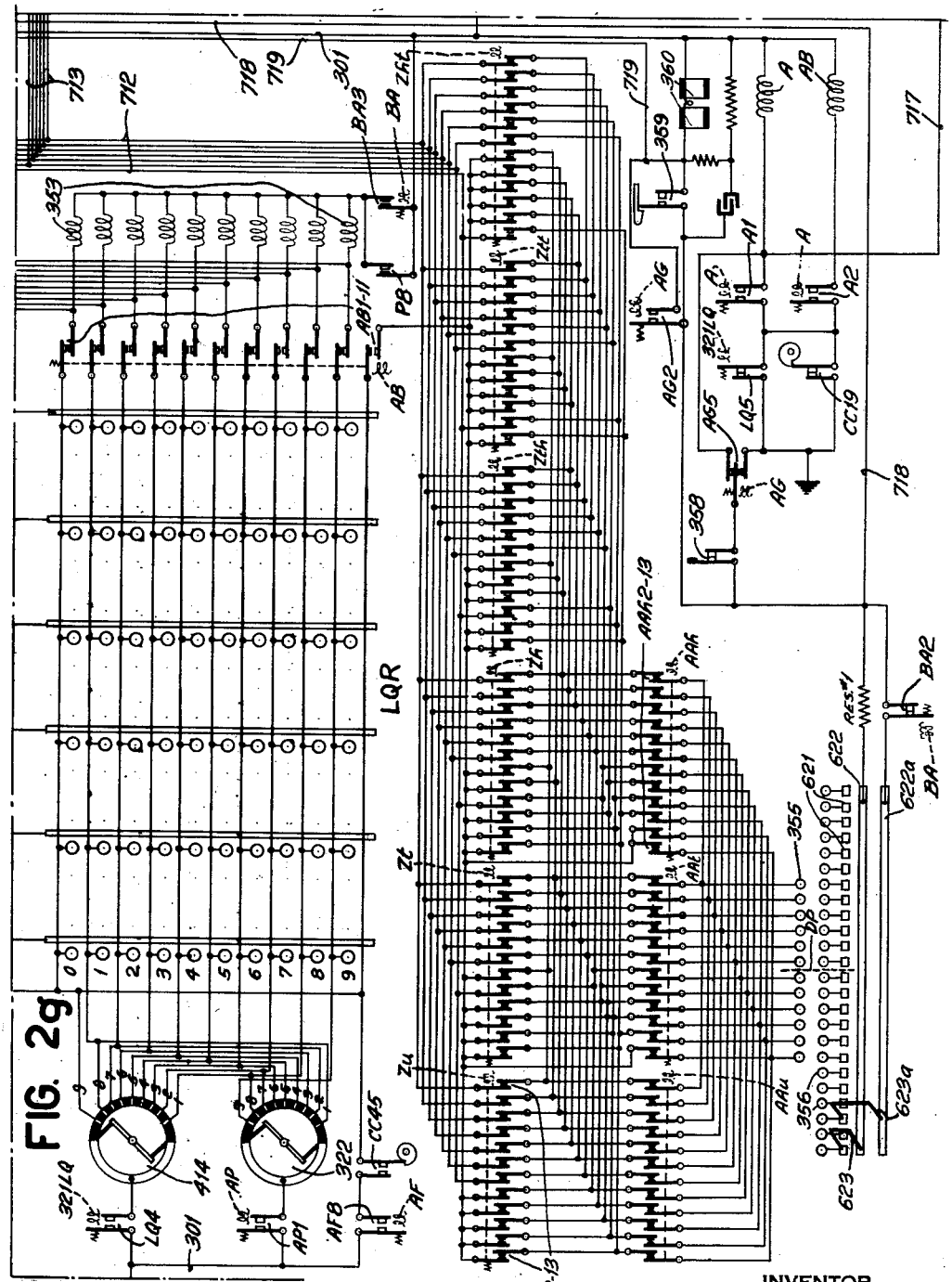

FIG. 2j.

May 8, 1945.  J. W. BRYCE  2,375,277
COMBINED MULTIPLYING AND DIVIDING MACHINE
Filed Feb. 11, 1942  19 Sheets-Sheet 13

INVENTOR
James W. Bryce
BY
W. M. Wilson
ATTORNEY

May 8, 1945. J. W. BRYCE 2,375,277
COMBINED MULTIPLYING AND DIVIDING MACHINE
Filed Feb. 11, 1942 19 Sheets-Sheet 14
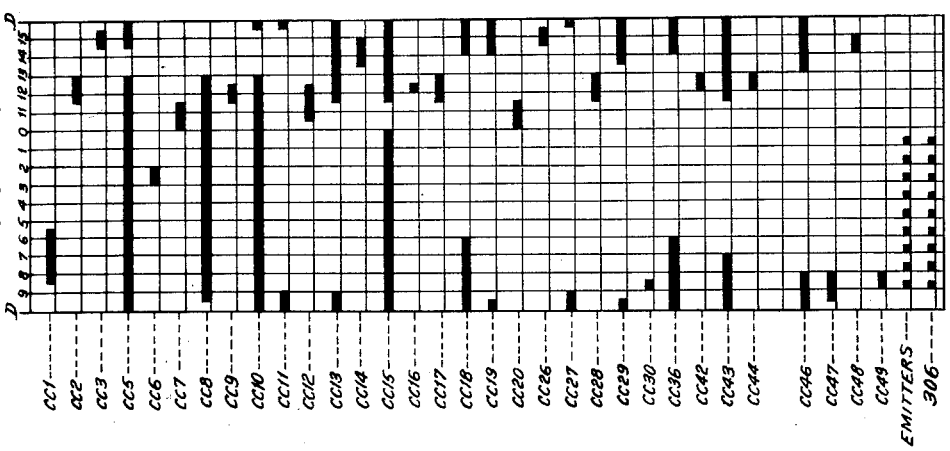
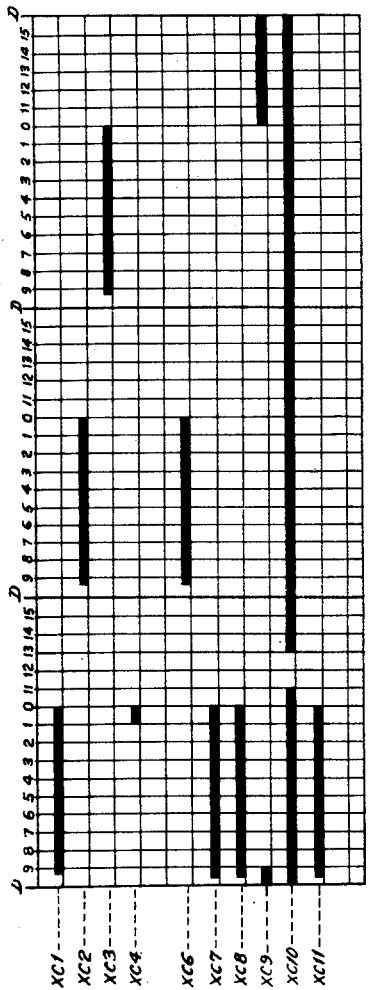
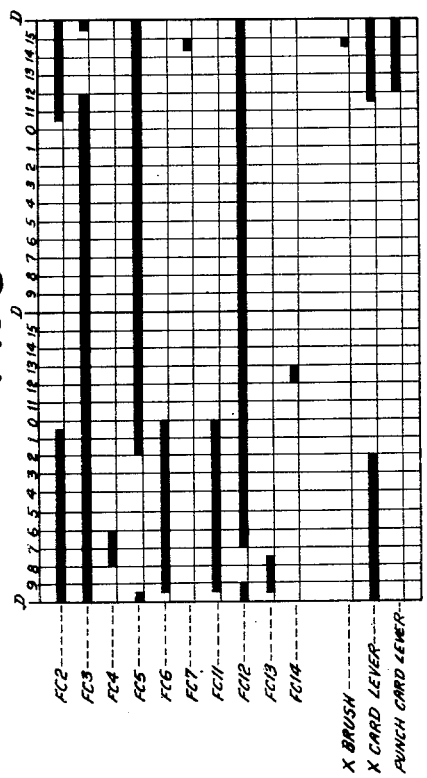
INVENTOR
James W. Bryce
BY
ATTORNEY May 8, 1945.   J. W. BRYCE   2,375,277
COMBINED MULTIPLYING AND DIVIDING MACHINE
Filed Feb. 11, 1942   19 Sheets-Sheet 15

INVENTOR
James W. Bryce
BY
ATTORNEY

May 8, 1945.   J. W. BRYCE   2,375,277
COMBINED MULTIPLYING AND DIVIDING MACHINE
Filed Feb. 11, 1942   19 Sheets-Sheet 16

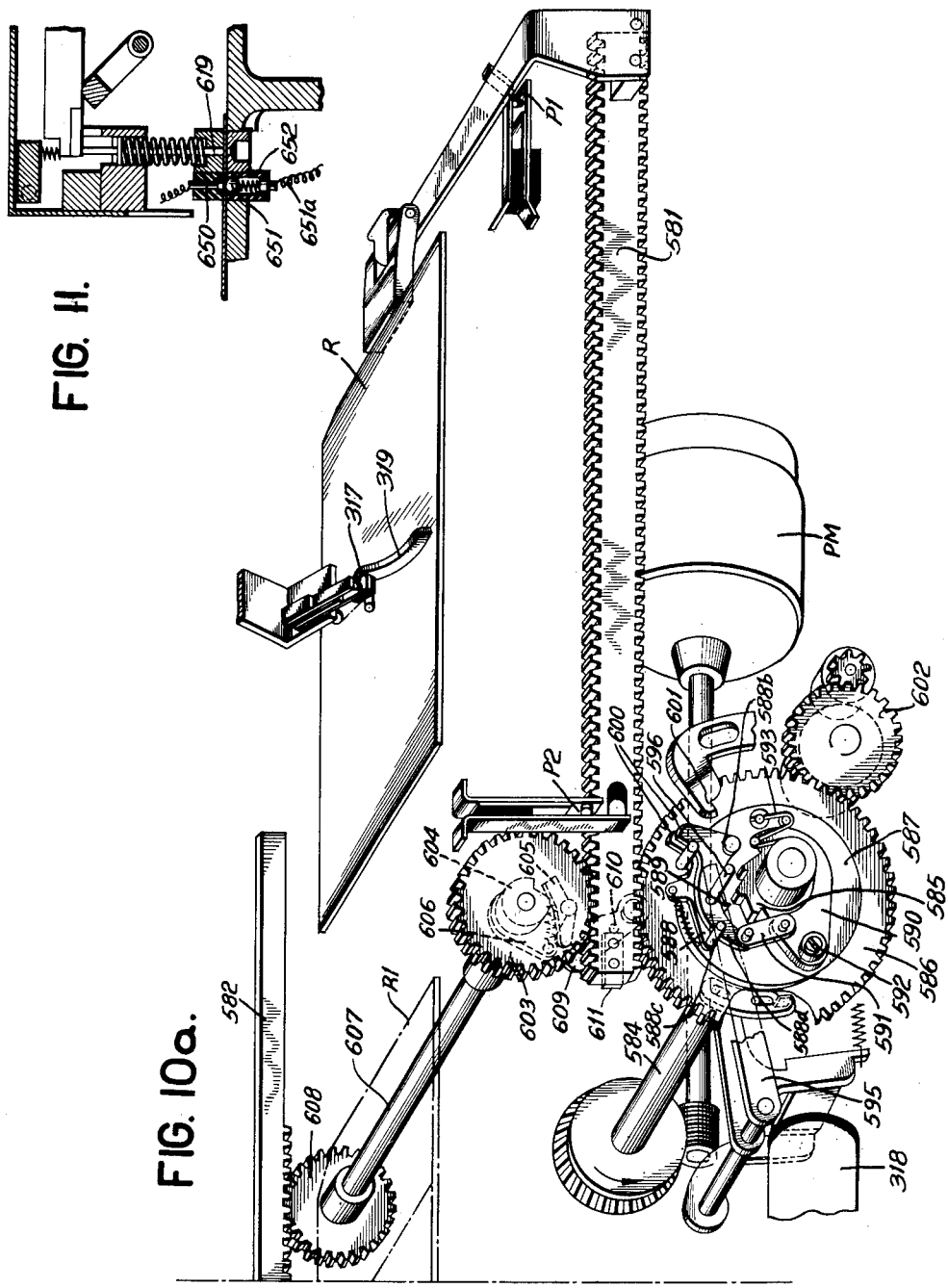

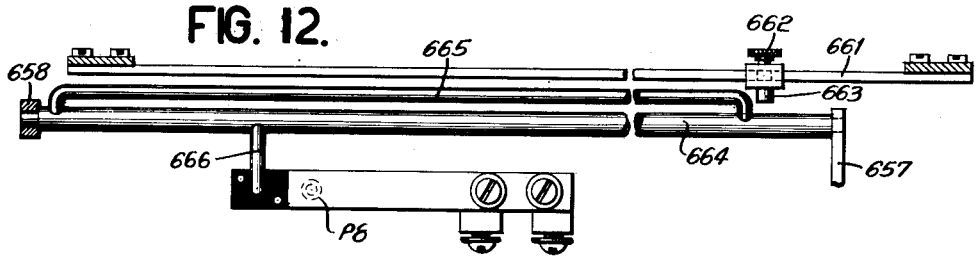
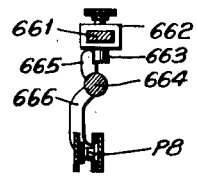
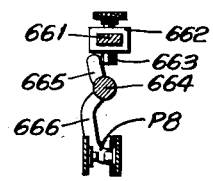
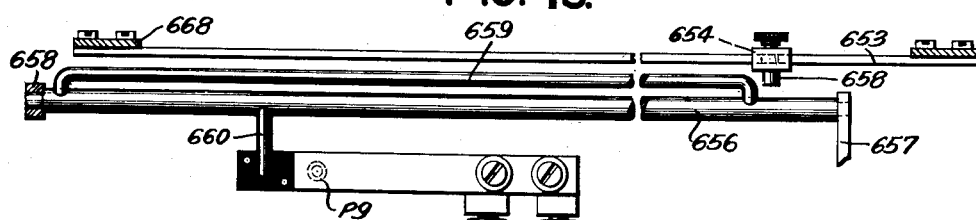
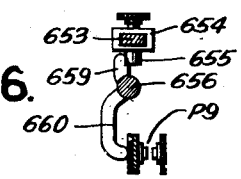
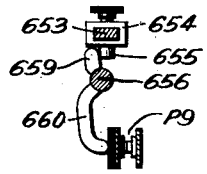
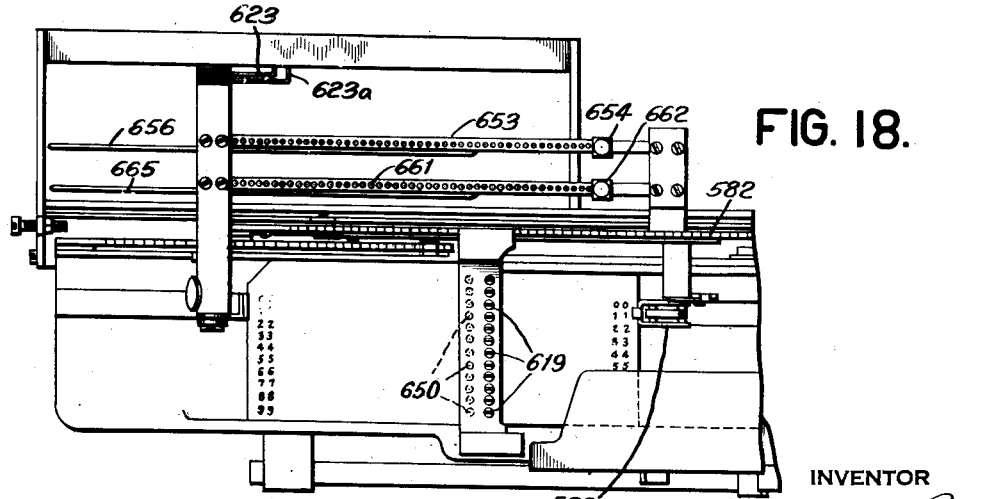

UNITED STATES PATENT OFFICE 2,375,277

COMBINED MULTIPLYING AND DIVIDING MACHINE

James W. Bryce, Glen Ridge, N. J., assignor to International Business Machines Corporation, New York, N. Y., a corporation of New York Application February 11, 1942, Serial No. 430,324

4 Claims. (Cl. 235—61.7)

This invention relates generally to calculating machines which are provided with both multiplying and dividing mechanisms and particularly to the type of machine wherein the result of the computation secured by the operation of one of the mechanisms is checked by a computation performed by the other mechanism. The checking of such computations is particularly useful and advantageous in record controlled machines wherein the computation result is recorded upon the record containing the original factors and since the accuracy of the computation result is vital in the accounting system in which the results of the computations are utilized, the checking operations are necessary and particularly desirable in accounting systems where extreme accuracy in results is required.

According to arrangements previously devised, it was proposed to provide a machine which would enable a computation of one type to be performed by either a dividing or multiplying mechanism to secure a computation result, either product or quotient according to the selected computation, and record the result on the card. It was proposed to have the factors of the computation, namely the multiplicand and multiplier on multiplying, or the dividend and divisor for the computation of division, together with the recorded product or quotient result taken from the card, then effect the subsequent recomputation by re-running the card through the machine. The change for the recomputation could not be effected automatically and required reconditioning of the machine for the recomputation by manual intervention which consisted primarily of replugging. By the provision of suitable checking devices, the correctness of the recorded quotient or product upon the record at the termination of the original combination was ascertained. If the computation result recorded (either quotient or product) was found incorrect, the operator of the machine was accordingly signaled so that the incorrectly recorded card could be removed and the computation again performed to secure the correct computation result. For each inaccuracy found in the computation result, a card was lost and while the value of the card per se was of no material consequence, yet it required the reperforating of a card for the factors of the computation.

It is also contemplated in Patent No. 2,206,218 to R. Blakely, dated July 2, 1940, to provide a machine which will check the product result of a multiplying computation by a subsequent recomputation of the same type without, however, requiring that the product result be recorded and the cards be re-run through the machine. Checking devices were also provided to check the newly acquired product before it is recorded upon the card, against the subsequently derived product result. Upon agreement, product recording would then ensue and by this arrangement, the reperforating of a card upon locating an incorrectly derived product was avoided. However, the recomputation for checking purposes was performed by the same type of computation, that is, an original multiplying operation was automatically followed by a subsequent multiplying operation. While, as stated in this patent, checking multiplying is effected with the factor entry relations reversed so as to provide different operations of the computing mechanisms involved, nevertheless there are mechanisms which are commonly operated for the original and subsequent computation in the same way, and furthermore, the checking of the originally derived product against the newly computed product does not provide for the extreme accuracy required in checking.

Accordingly, the present invention provides to overcome the disadvantages of the previous arrangements by effecting a recomputation by a different type of computation and since the same calculating mechanisms do not operate in the original and recomputation, the desired efficiency in checking is attained. Furthermore, in the actual checking operation, different value representations are compared rather than the comparison of supposedly the same values, such as the product, as was proposed in the aforementioned Patent No. 2,206,218.

The principal object of the present invention is, therefore, to provide an arrangement which will effect a computation of one type which is secured by one form of computing mechanism and then automatically perform without manual intervention a computation of another type under control of one of the factors for the original computation and the previously derived computation result.

More specifically, it is an object of the invention to provide an arrangement of the type just described with checking devices which will determine whether the computation result of the original computation is correct.

A still further object is to suppress the recording of the computation result upon the record which is derived from one computing mechanism until the termination of the operation of the second computing mechanism and the operation of the checking devices which has determined whether or not the computation result is correct.

More specifically, in connection with the specific forms of calculating mechanisms provided, it is an object of the invention to provide a multiplying mechanism which will effect a multiplying operation under control of the multiplicand and multiplier factors from a card and enter the product result on a value representing means, then automatically recompute by the use of a dividing mechanism, the latter being controlled by one of the factors controlling the multiplying operation and utilizing the product result as the dividend. In carrying out the original computation and recomputation, the computed quotient should equal the other factor controlling the multiplying operation.

A still further object of the invention in connection with the specific form of multiplying and dividing mechanisms is to utilize a type which enables either computation to be performed with a minimum number of computing cycles. For the want of a better name, this is termed a computing mechanism of the "digital multiple comparison type"; that is to say, multiples of one factor are set up for comparison purposes upon effecting division, or for addition of selected multiples for multiplying operations. In connection with this specific form of the machine is an object of the invention to provide a common multiple receiving means which will enable multiples to be set up of one of the factors when effecting one type of computation, and then automatically cleared out of such representation so digital multiples of another factor to be utilized in the recomputation may be represented thereon.

A still further object of the present invention is to provide certain entry shift mechanisms in addition to those normally provided under control of the digit representations on the cards which are effected in a well known manner. Where one type of computation automatically follows another type of computation, certain additional entry shifts must be provided so as to enable the representation of the factor amounts in the proper denominational order and these additional supplemental entry shifts form a relatively important part of the present invention.

In checking the product result of a multiplying computation, the product amount is entered in one accumulator and in effecting the recomputation for checking purposes by the dividing mechanism, an entry shift is made so that this product amount is entered in the dividend receiving accumulator and shifted denominationally so that the digits are at the extreme left of the accumulator. This entry shift from the product accumulator to the dividend receiving accumulator is effected by sensing of the product receiving accumulator for the presence of zeros at the left and the denominational shift is accordingly made. There is also an additional shift provided to cause the entry of one factor of the multiplying operation to be shifted in the digit receiving accumulator so that its entry is at the extreme left of such accumulator, it being customary to enter the quotient digits beginning at the extreme left then to the right utilizing successive orders. This order is necessarily required, due to the desirability of bringing the quotient digit receiving accumulator to zero if the original computation has been correctly performed.

It is pointed out that by the provision of such supplemental entry shifts, a recomputation may automatically follow the original computation without manual intervention, the different denominational shifts being automatically effected so as to cause entries in the proper denominational orders.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1 and 1a taken together with Fig. 1a to the right of Fig. 1 show a somewhat diagrammatic view of the various units of the machine and the drive therefor.

Figs. 2a to 2k, inclusive, taken together show the complete circuit diagram of the machine when arranged as shown in Fig. 3.

Fig. 4 is a cam timing diagram showing the timing of the various CC cams.

Fig. 5 is a cam timing diagram of the FC cams.

Fig. 6 is a cam timing diagram of the XC cams.

Figure 10:
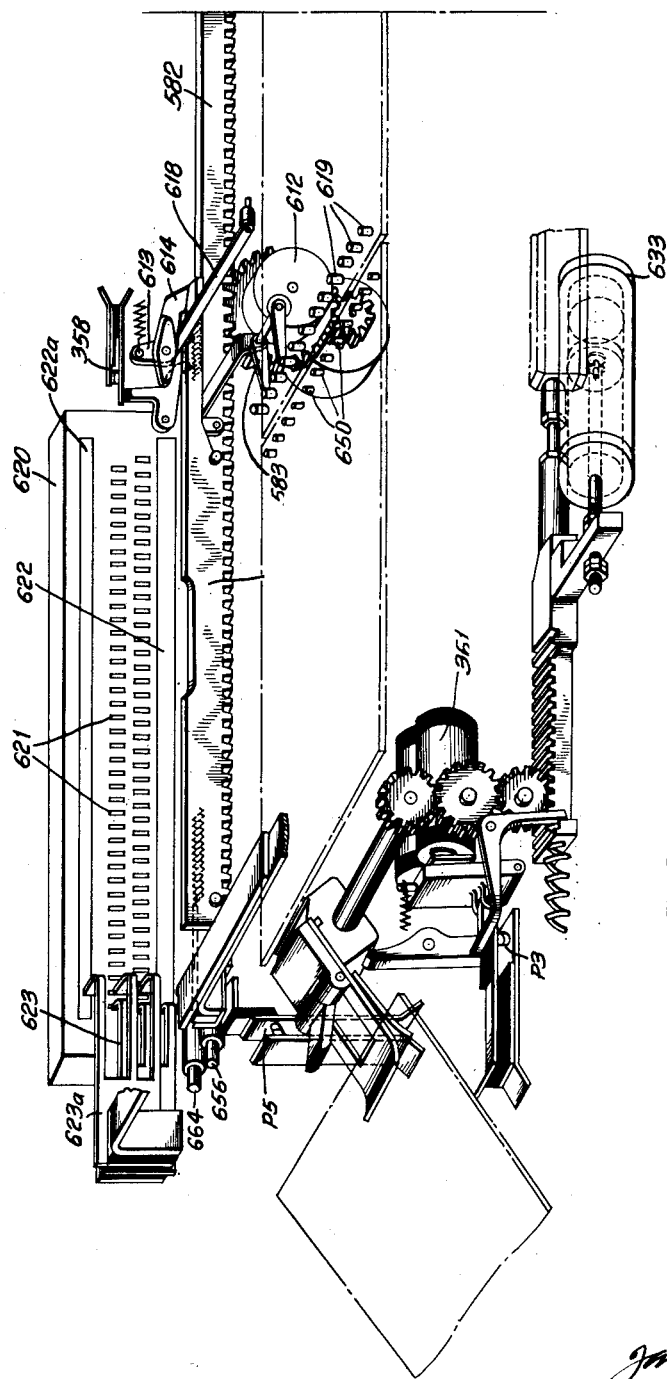

Figs. 10 and 10a with Fig. 10 at the left show a perspective view of the illustrative punching machine, only the elements essential to the understanding of this machine being illustrated.

Fig. 11 is a sectional view taken through the special analyzing mechanism in the punching machine for analyzing the punched holes representing the computation result for comparison with the computation result representing means it is controlled by.

Figs. 12-17 are views of the contact controlling devices provided in the punching machine, Figs. 12 and 15 being views in front elevation. Figs. 13 and 16 are sectional views and Figs. 14 and 17 are views corresponding to Figs. 13 and 16 but with the parts shown in operated position.

Fig. 18 is a plan view of part of the punching machine indicating the location of the contact controlling devices shown in Figs. 12-17.

Machine drive

Referring first to Figs. 1 and 1a, in general the machine is similar in type to the computing machine shown in patents, No. 2,328,610 and No. 2,315,686 and comprises six accumulating units which are respectively designated SP, LQ, RD, PQ, ML, and MP. It may be explained that the ML unit contains accumulators and readouts from which all of the nine digital multiples of the divisor or multiplicand can be derived depending upon whether the machine is used for division or multiplication. The MP receiving device receives the multiplier upon entry for multiplying calculations. The accumulating units LQ and RD receive components of the products upon multiplication with the final product forms in LQ and upon division LQ receives the quotient amount and RD receives the dividend amount. When checking these calculations, the PQ accumulator replaces the LQ accumulator in the above mentioned operations. The SP unit is utilized to store values which are to be used for checking. The various accumulating units are driven by the gearing delineated from the driving motor M. The machine is also provided with a direct current generator DC. The card handling and feeding section of the machine is of customary form like that shown in the Daly Patent No. 2,045,437 and is driven in the usual manner. The punching section of this mechanism, however, has been modified and will be explained in detail later. The FC cam contacts are also driven in the customary manner in synchronism with the drive of the card handling section of the machine. The units designated CY, BD, N—R, AT, TT are electromechanical relay setup units of the general construction shown in Figs. 16 and 17 of Patent No. 2,315,686. Each of these units is adapted for reset from the constantly running drive shaft by the customary one-revolution clutch arrangement. The reset magnets for the units are respectively designated 321CY, 321BD, 321N—R, and 321AT—TT. The comparing units are as shown diagrammatically at CU—CU. These comparing units are of the forms shown in Figs. 12 to 15 inclusive of Patent No. 2,315,686 and such units are adapted to be driven from the drive shaft by the use of the well known one-revolution clutch, the clutch magnet being designated 342. Also driven from the main drive shaft are the usual CC cams designated CC1—49, and the impulse distributor 306. In addition, there are also provided eight impulse emitters which are designated 314, 344, 348, 350, 375, 511, 414, and 322. Referring now to the XC1—12 cam contacts, such cam contacts are driven from the drive shaft through a one-revolution clutch which is controlled by magnet 312. The drive side of the one-revolution clutch receives its drive from the main drive shaft through the gearing shown which drives the XC cams one revolution for each three revolutions of the main drive shaft.

For clarity and subsequent description, the upper and lower drive shafts will be given a like reference numeral 50.

*Accumulators and entry receiving devices*

As stated, the SP, LQ, RD, PQ, ML and MP units are accumulators of electromechanical type. These accumulators are identical in construction except for the number of readout sections, some accumulators having four readout sections and others having two. The accumulator which is here employed may be of various types known in the art, more particularly the type of accumulator having electrical transfer and electrical reset. Suitable accumulators of this type are shown and described in United States Patent No. 1,834,767 and suitable readout structure may be that shown in United States Patent No. 2,062,117 employing the electric reset of Patent No. 1,834,767, modified as per British Patent No. 422,135.

The present invention involves transfer total arrangements according to British Patent No. 422,135.

While the aforesaid accumulators are of suitable type for use with the present invention, preferably a preferred accumulator is of the form illustrated and described in Lake and Pfaff Patent No. 2,232,006, dated February 18, 1941, and more fully shown in Patent No. 2,315,686.

*Insertible plugboards*

In order to quickly shift the machine controls from one status in which it is capable of effecting one type of computation to another status for effecting another type of computation use is made of insertible plugboard elements. This insertible plugboard construction is of a type known in the art and the insertible plug unit is generally indicated at 141 in Fig. 18 of Patent No. 2,315,686. Devices of this type are generally known as "automatic plugboards" and a suitable form of such board is shown and fully described in the patent issued to C. D. Lake, No. 2,111,118, dated March 15, 1938. Such automatic plugboard arrangement comprises a series of relative fixed machine sockets to which the fixed machine wiring is connected. Adapted for cooperation with such sockets are plug prongs carried by a replaceable plugboard assembly or unit. Such plug prongs on the replaceable board are in turn connected to plug sockets upon the replaceable board. These plugboard sockets may be in turn plugged up by the operator selectively at will or the entire board may be preplugged with a desired set of connections.

Figure 7:
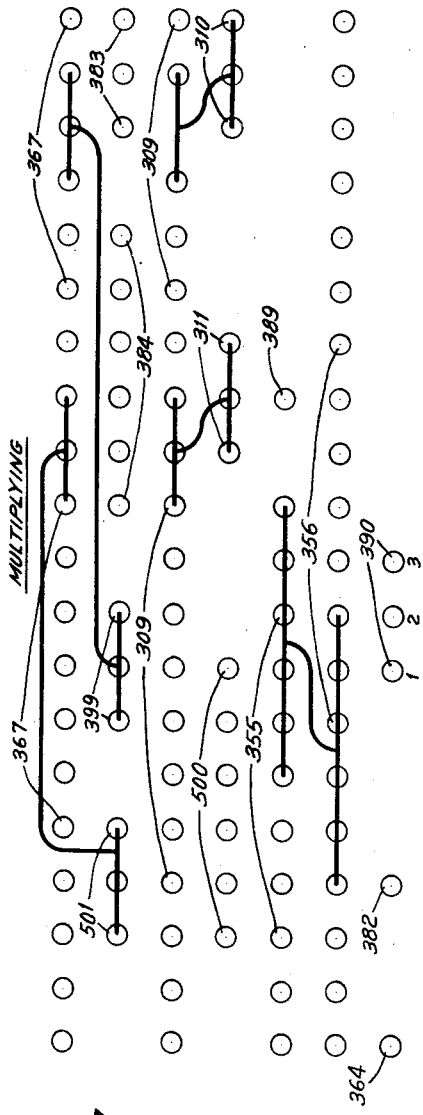
Fig. 7 shows the plugging on the insertible plugboard for the calculation performed by the machine.

The manner in which the replaceable plugboard units 141 are wired and plugged for different computations is shown in Fig. 7.

It may be explained that the plug socket reference numerals used on the circuit diagram will have similar reference numerals to those used on the diagrammatic plugboard.

*Cam timing diagrams*

The cam timing diagrams, Figs. 4 to 6, inclusive are self-explanatory. It should be noted that the CC cam contacts of Fig. 4 make one revolution per machine cycle. The FC cam contacts of Fig. 5 make one revolution per card feed cycle which comprises two machine cycles. The XC contacts of Fig. 6 make one revolution for three machine cycles. The numbering of the cam contacts shown herein carrying the same designations as the cam contacts in the application of Bryce et al., Serial No. 213,044 (now Patent No. 2,328,610) have the same timing. Cams which have designating numbers higher than any of the numbers used in the application referred to are extra cam contacts utilized for the operation of certain mechanisms not disclosed in the application referred to.

*Multiplying two values—checking computed product by a division calculation before recording product*

In the calculation now to be explained together with the checking of the result of the calculation, the sequence is such that a multiplying operation is first performed to secure a product but prior to punching the product on the record card controlling the multiplying calculation, the product is checked for its accuracy by a division calculation. The mathematics of such sequence of operations is outlined in Fig. 9 in which it is assumed that the multiplicand amount MC is 358 and the multiplier amount MP is 147. In the form of multiplying machine preferably utilized, the multiplicand amount has all of its nine multiples built up and represented in the ML receiving units. The selected multiples are derived in accordance with the MC value 358 and the product amount derived is entered into the LQ accumulator. For checking the product result by division, the product amount is transferred from the LQ accumulator into the RD accumulator which comprises the dividend receiving accumulator. All of the multiples of the multiplicand previously built up and represented in the ML units are cleared out and all the nine digital multiples of the multiplier unit 147 are now built up and represented therein. Division operations then ensure in a well known manner. Prior to division calculations, the MC amount 358 is entered as a tens complement into the PQ accumulator which receives the quotient digits. Obviously, if the quotient digits derived as the result of division operations are correct, the PQ accumulator will be brought to a zero status. With respect to the RD accumulator, it is obvious that since the selected multiples of the multiplicand amount are subtracted therefrom as the division operations ensue, the RD accumulator should also be brought to a zero status. Both the PQ and RD accumulators are tested to determine their zero status and if this condition obtains, it indicates that the product result previously described is correct. Upon this determination, the product result previously entered in the LQ accumulator as the result of the multiplying calculation and still represented therein is read out to control product recording on the card. In order to determine whether the recorded product result has been correctly punched, as the successive digits are punched on the card they are analyzed and checked back against the product result standing on the readout LQR of the LQ accumulator. Having briefly outlined how the machine functions to perform the above calculations and verification of the recorded results, there will now be given a detailed description of the operation of the machine taken with particular reference to the wiring diagram shown in Figs. 2a to 2k, appropriate headings being used for sub-division of the subject matter explained.

Figure 2C:
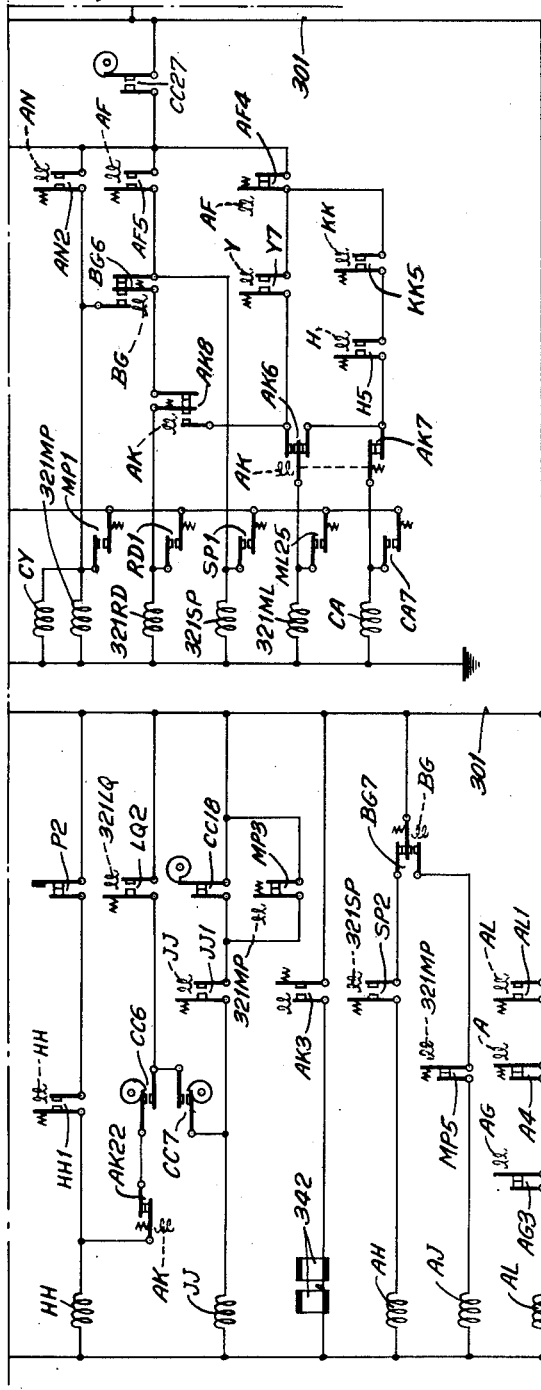
Figure 2H:
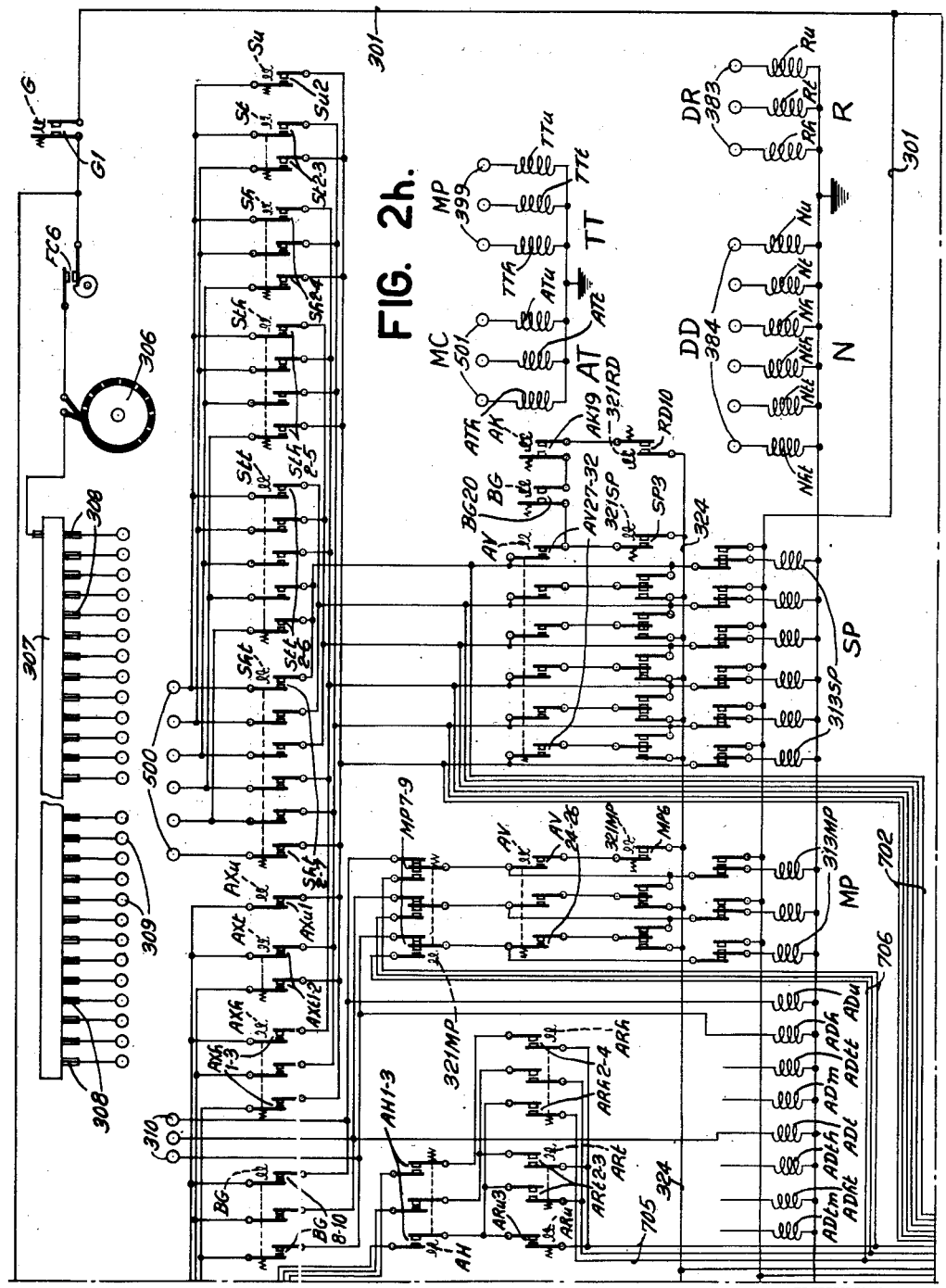
Figure 2I:
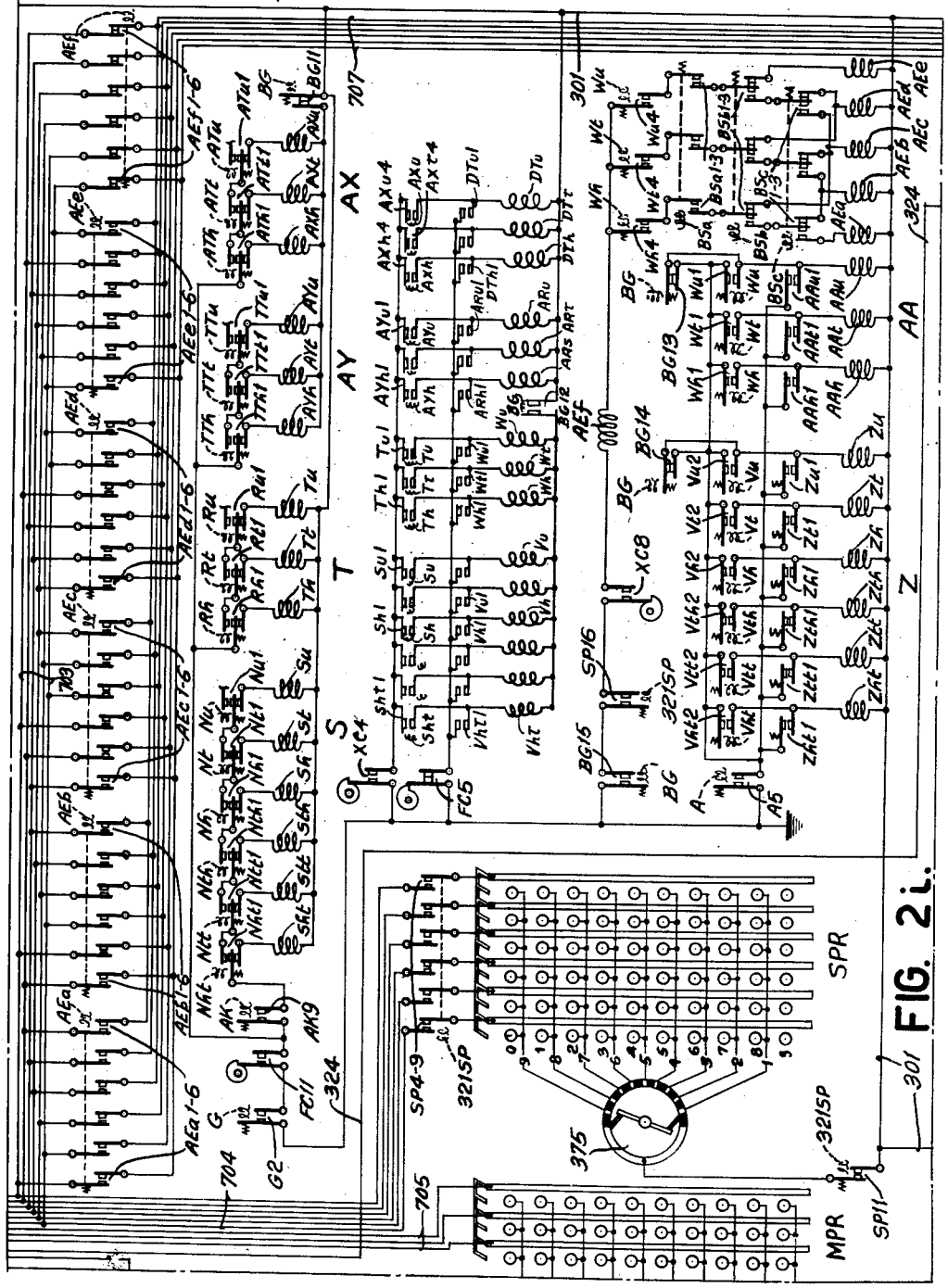
Figure 2J:
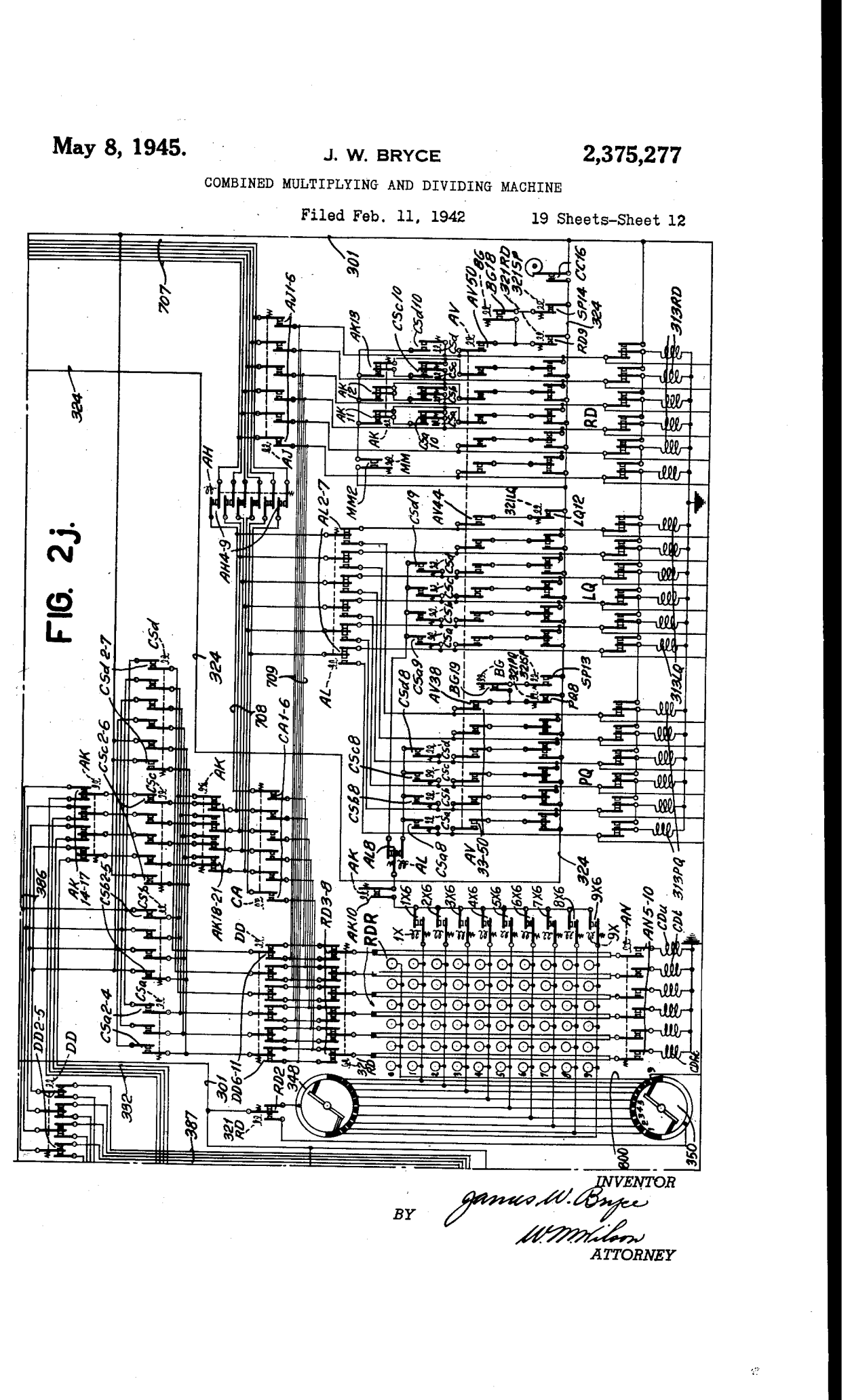
Figure 2K:
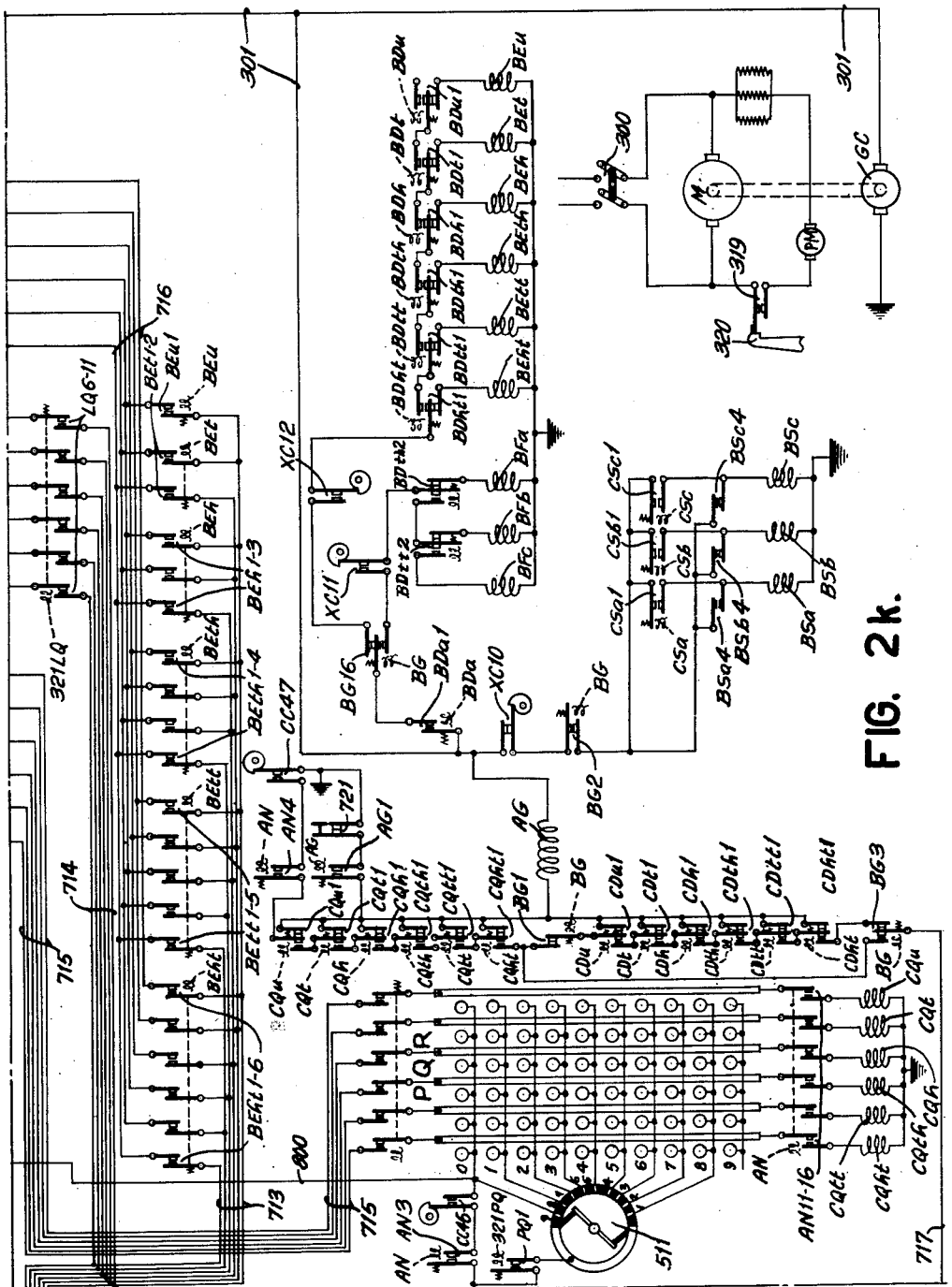

Assuming that a set of record cards is in place in the supply magazine in the machine, the operator then closes line switch 300 (Fig. 2k). Closure of switch 300 starts the main drive motor M in operation. Coupled to the main drive motor M is a grounded direct current generator DC which supplies current to the line 301. The operator now depresses start key 302 (Fig. 2b) and a circuit is completed from ground through the E relay coil through the start key 302, through the normally closed F1 contact, through FC3 to line 301. The relay coil E being energized is maintained energized by a stick circuit through the relay contacts E1 and cam contacts FC2. The energization of relay coil E closes relay contacts E2 and a circuit is completed from line 301 through CC29 through P1 through E2, through JJ2, through the stop key 303, through the card feed clutch magnet 304, through the closed points of D1 to ground.

During the first machine cycle of the first card feed cycle, cam contacts FC14 close (Fig. 2c) to send an impulse to the reset magnets 321 for the N—R, AT and TT electromechanical relay units, to reset them and clear the previous setting, to thereby condition them to receive a setting under control of the first card fed. The card is now fed by the card feeding and handling section of the machine (Fig. 11 of Patent No. 2,315,686) and is advanced toward the reading brushes in the usual way. In starting up the machine for the run of cards, the start key must be maintained depressed for two card feed cycles, or it may be depressed and released and redepressed. Late in the second machine cycle of the card feed cycle, the card lever contacts 305 (Fig. 2b) close bringing about an energization of relay coil G. Energization of relay coil G brings about closure of relay contacts G1 (Fig. 2h) which affords current supply through the FC6 cam contacts to the circuit breaker 306 from which current impulses flow to the card transfer and contact roll 307. The usual regular reading brushes 308 (see Fig. 11 of Patent No. 2,315,686) are provided which are connected to plug hubs generally designated 309. Closure of G1 contacts also affords current supply through FC7 (Fig. 2d) to the contact roll 370 when FC7 is closed for sensing of zeros. Shortly after the card lever contacts 305 close, a circuit is completed through G1 contact through FC7, the contact roll 370, brushes 371, plug hub 367, thence by means of plug wire connections (see Fig. 7) from plug hubs 399 for the MC and MP amounts to plug hubs 501 and 399, respectively (see also Fig. 2h) to selectively energize the coils of relay units AT and TT setting up these electromechanical relays, for a purpose which will be explained later.

The energization of relay coil G also causes the relay contacts G4 (Fig. 2b) to become closed. When CC29 closes at the end of the second machine cycle of the card feed cycle, a circuit will be established not only to the card feed clutch magnet 304 in a manner previously traced, but a branch circuit will be established through G4 contacts, through the contacts AF6 now in the position shown, to the clutch control magnet 312, to ground. This clutch magnet releases for rotation the group of XC cams which, upon release, function for three machine cycles.

During the first machine cycle of the operation of the XC cams, cam contacts XC5 (Fig. 2c) close to energize the reset magnet 321BD, conditioning it for a subsequent setup. Also in this cycle, cam contacts FC14 close to again energize the reset magnets 321 for the N—R, AT and TT electromechanical relay units to again enable them to be set up under control of the following. During this second card feed cycle when cam contact FC11 (Fig. 2i) closes, a circuit will be completed from ground through the now closed G2 contacts, through cam contacts FC11 through R$h$1, through relay coil T$h$, to line 301. The energization of coil T$h$ causes closure of the group of contacts T$h$2—4 (Fig. 2d). These contacts remain closed during the entering portion of the feed cycle. At the same time the relay coil T$h$ (Fig. 2i) is energized one of the relay coils AY and AX is also energized according to the number of zeros to the left of the MP and MC amounts and since, in the problem illustrated, there are no zeros in the MC and MP amounts 358 and 147, the relay coils AY$h$ and AX$h$ are energized.

In the problem assumed, it was stated that the relay coil AY$h$ was energized and the energization of this relay coil will close its respective relay contacts AY$h$1 (Fig. 2i). As was previously described, the operation of XC cams was initiated and during the first cycle thereof, cam contacts XC4 will close, thereby closing a circuit from the ground through cam contacts XC4, through the relay contacts AY$h$1 now closed, through the relay coil AR$h$, to line 301. This coil will close its stick contacts AR$h$1, the stick circuit extending back through cam contacts FC5 which are closed during the multiplying operations, to the ground.

In the problem assumed relay coil AX$h$ is energized and the energization of this relay coil will close its respective contacts AX*h*4 (Fig. 2*i*). When cam contacts XC4 close, relay coil DT*h* will be energized by the energizing circuit through AX*h*4 contacts to the DT*h* relay coil. Relay coil DT*h* will close its stick contacts DT*h*1, the stick circuit also extending, as just described, back to ground through cam contacts FC5.

Entry of MC amount

Also during the entering portion of the cycle, cam contacts XC1 close to energize relay coil K (Fig. 2*b*). With relay coil K energized the K1—15 contacts (Fig. 2*d*) are closed. The MC amount is then entered by the plug connections made between plug hubs 309 to 311 (Fig. 7), into the ML accumulators through the T*h*2—4 (Fig. 2*d*) contacts now in closed position, down to the now closed K1—15 contacts. The amount of this multiplicand is entered into the following multiplying receiving devices: ML1—2, ML3—6, ML5, ML7, and ML9.

At the same time that the MC amount is being entered into the ML1—2 etc. accumulators, the same amount is being entered into the SP (Fig. 2*h*) accumulator in extreme left hand position. This is effected by wire connections 701 (Fig. 2*d* to Fig. 2*h*), the circuits then being continued through contacts AX*h*1—3 now closed, to 313SP accumulator magnets, to enter the MC amount in the SP accumulator (see also Fig. 9).

On the circuit diagram (Fig. 2*d*) the reference numerals 313 refer to the accumulator magnets, that is 313ML (Fig. 2*d*) refers to the accumulator magnets of the multiple receiving devices, 313SP (Fig. 2*h*) refers to the accumulator magnets of the SP accumulator, etc. At this point, it may be explained that the multiple receiving devices are commonly used for both multiplying operations and dividing operations. In multiplication, these multiple receiving devices are used to build up and store nine different multiples of the multiplicand and on division the same multiple receiving devices are used to build up and store nine different multiples of the divisor. The multiple receiving devices have been previously described. These are in the form of electrical controlled accumulators with electrical readouts. The ML1—2, the ML3—6 and the ML4—8 receiving devices are provided with doubling readouts in addition to the usual straight readouts. The other multiple receiving devices are provided with straight readouts only. On the entry portion of the feed cycle as explained, the amount of the multiplicand is entered into the five of the multiple receiving devices concurrently.

Entry of MP amount

The multiplier amount is entered to the MP accumulator during this same cycle in the following manner: from the plug hubs 309 (Fig. 2*h*) by means of plug wires (see Fig. 7) to plug hubs 310 (Fig. 2*h*), through the MP7—9 contacts now in the position shown, to the 313MP accumulator magnets, to ground. The amount of the multiplier 147 is thus entered into the MP multiplier receiving devices.

Coincidental with this setup of the multiplier in the multiplier receiving device, there is a setup of the cycle controller and this setup is made according to the significant digits in the multiplier amount. Assuming 147 to be the amount of the multiplier, at the "7" index point of the cycle the AD*u* relay coil (Fig. 2*h*) is energized, at the "4" index point the AD*t* relay coil is energized and at the "1" index point the AD*h* relay coil is energized.

During the entry cycle, controls are set up to cut off the start key control circuit and to also maintain operation of the machine under record card control. Referring now to Fig. 2*b*, early in the entry cycle, cam contacts FC4 close energizing relay coil F as follows: line 301, through card lever contact 305, through FC4, through relay coil F to ground. Relay coil F being energized, it is maintained energized by a stick circuit which is completed through contacts F1 and cam contacts FC3. The shift of the F1 contacts cuts off the circuit to the start key contacts 302. Energization of relay coil F closes contacts F2 to maintain a stick circuit for relay coils F and G either through FC3 or the card lever contacts 305.

Build-up of multiples of MC amounts

It has been previously explained that on the entry cycle, the multiplicand amount was entered into ML1—2, ML3—6, ML5, ML7 and ML9. During the machine cycle following the entry cycle, there occurs the first step in the build-up of further multiples. As stated, the ML1—2 receiving device is provided with a doubling readout. This is designated ML1—2 on Fig. 2*e*. In the second machine cycle of the operation of the XC cams, cam contacts XC2 (Fig. 2*b*) close energizing relay coil L. With relay coil L energized, relay contacts L1—16 (Fig. 2*d*) are closed and current supply is afforded through the adding emitter 314 (Fig. 2*e*) as follows: from line 301, through the normally closed contacts MM1, through the normally closed MP10 contacts, through the normally closed contacts ML28, through emitter 314. By this emitter, the impulses flow over to the transverse busses of the doubling section of MLR1—2, down through the piloting section of this readout and out via a group of lines generally designated 315. From these lines, the impulses flow through the L1—16 contacts (Fig. 2*d*) which are now closed, and ultimately reach the ML3—6, ML4—7, ML5 and ML9 accumulators or multiple receiving devices. This operation will have completed the build-up of the "three" multiple in ML3—6.

In the following machine cycle, cam contacts XC3 (Fig. 2*b*) close (see Fig. 6) energizing relay coil M and causing closure of relay contacts M1—16 (Fig. 2*d*). With the emitter 314 in operation the "two" multiple of the multiplican is read out from the MLR—2 and is transmitted via lines 315, through the M1—8 contacts to the ML4—8 and the ML5 accumulators. This will have completed the building up of the "four" and "five" multiples in these receiving devices. During the same cycle in which these multiple entries are being made, the "six" multiple of the multiplicand is read out of the doubling readout section of MLR3—6 and such "six" multiple is transmitted via lines 316, through the M9—16 contacts, and finally reaches the ML7 and the ML9 receiving devices. This operation will have completed building up of the "nine" multiple in ML9 and the "seven" multiple in ML7. The multiple building up operations are now completed.

During the second machine cycle of the card feed cycle, the record card from which the factors were read is advanced to the punch tray in the usual manner. Upon reaching this tray the contacts 317 (Fig. 11 of Patent No. 2,315,686) close to energize relay coil D (Fig. 2*b*). The energizing of relay coil D shifts relay contacts D1 to a reversed position from that shown, opening the circuit through the card feed clutch magnet 304 and completing a circuit for the punch rack trip magnet 318, upon closure of cam contact CC1, with contacts P3 and the relay contacts B1 closed. The relay contacts B1 become closed upon energization of relay coil B, which is energized upon closure of the customary last column punch contacts P5, since contacts AG4 are now closed. Closure of contact B1 closes a circuit to the card eject magnet 361, also shown in Fig. 10. With the punch rack trip magnet 318, energized, contacts 319 (Fig. 2k) become closed and remain latched closed in the customary manner by latch 320 (Fig. 2k). The current supply is then provided for the punch driving motor PM, endwise card feed occurs in the usual way to feed the card to the R1 position (Fig. 10 and Fig. 10a) in a manner to be later described.

Reset of LQ and PQ

With the relay coils B and D energized in the manner previously explained, relay contacts B2 and D2 (Fig. 2b) become closed. Upon closure of cam contacts CC27, current will flow from line 301, through these contacts, through the normally closed HH2 contacts, through the now closed D2 and B2 contacts, through 321LQ and 321PQ relay coils which are in parallel, to ground. The energization of 321LQ causes LQ1 to close, setting up a stick circuit for 321LQ and 321PQ back through CC5. Upon energization of the 321LQ relay, contacts LQ6—11 (Fig. 2k) LQ12 (Fig. 2j) are closed. Contacts LQ4 are also closed, affording current supply from line 301, through LQ4 (Fig. 2g) to the emitter 414. The emitter 414 is wired complementary to the LQR readout, thus complemental impulses representative of the 9's complement of the amount standing in LQ flow via lines 712, connecting lines 713, 714 (Fig. 2k) over through the now closed LQ6—11 contacts, through 313LQ accumulator magnets (Fig. 2j), to ground. By thus introducing the 9's complement of the amount standing in LQ, the LQ accumulator elements are restored to a "9" position. To bring the accumulator to zero from the all "9" position, an elusive one is entered in the units order at the carry time in the cycle. This entry is provided through the LQ12 contacts (Fig. 2j) which are closed in a manner previously explained. This impulse is supplied in the following manner. From line 301, through CC16 (Fig. 2j), wire 324 transmitting this impulse at the carry time, through the LQ12 contact, through the normal carry relay contacts AV44 controlled by the relay coil AV, to the units order of the 313LQ magnets. The units order is thus advanced one step and the electrical transfer devices of the accumulator cause advance of all the higher orders one step.

It may be explained that as long as the machine is operating, cam contacts CC2 (Fig. 2b) close once each machine cycle at the carry time in the operation of the accumulators. Such closure of cam contacts CC2 energizes relay coil AV. The energization of the coil AV closes all of the associated AV relay contacts. Since coil AV becomes energized once each machine cycle, the aforementioned relay contacts thus close at the carry time. The closure of these contacts permits the electrical carry devices to be effective for performing carry operations whenever they are required in their related accumulators.

Upon energization of relay coil 321PQ, as previously explained, the PQ1 contacts and the PQ2-7 (Fig. 2k) contacts are closed. Closure of PQ1 affords current supply to the emitter 511 from line 301. Emitter 511 is wired complementally to the PQ readout PQR and the nines complemental impulses are transmitted through the now closed PQ2-7 contacts, by wires 715, through the 313PQ accumulator magnets (Fig. 2j) to ground, thus setting the PQ accumulator elements to all nines position. PQ8 is also closed at this time, and therefore, at the carry portion of the cycle a carry or an elusive one impulse is entered from line 324 through contacts PQ8, through contacts AV38, through the units order 313PQ accumulator magnet, to ground, thus restoring the units order element to zero, and by means of the usual carry circuits all of the higher order elements of the PQ accumulator are restored to zero.

During the LQ and PQ reset, provision is made to prevent repetition of such reset. This reset preventing means is provided for as follows: During the LQ reset, LQ2 contacts are closed (Fig. 2c). Accordingly, when cam contacts CC6 close, a circuit is completed from line 301 through LQ2, through cam contacts CC6, through relay contacts AK22, througgh relay coil HH to ground. Relay coil HH becoming energized establishes a stick circuit for itself through HH1 contact and the punch control contact P2 (now closed) back to line 301. The relay contacts HH2 (Fig. 2b) open and thus interrupt the reset initiating circuit to 321LQ and 321PQ.

Initiation of multiplying computation

Computing operations of the machine, that is to say, the adding of selected multiples of the multiplicand into the product receiving device are initiated by the LQ reset. From the LQ2 (Fig. 2c) contacts, a branch circuit is completed through the JJ relay coil when cam contacts CC7 close as follows: line 301, through LQ2 contacts now closed, through cam contacts CC7, through JJ relay coil, to ground. The energization of the JJ relay coil sets up a holding circuit for itself back through JJ1 contacts now closed, through MP3 contacts to line 301. Coil JJ is the computing initiating control relay.

In general, the machine has two cycle controllers. One cycle controller drives its control from odd number columns of the multiplier. The other cycle controller drives its control from the even number columns of the multiplier. Each cycle controller tries to cause its operation in the minimum number of successive machine cycles and both cycle controllers can operate concurrently. One cycle controller will direct entries into one accumulator and the other cycle controller will direct entry into the other accumulator. In the complete wiring diagram only a three order multiplier is utilized but in practice this multiplier might contain many more orders. The cycle controller, however, is shown with provision for more than three orders in order that its principles of operation may be disclosed and understood. The general function of this cycle controller is described in greater detail in the Bryce et al. application, Serial No. 213,044.

Entry of selected multiples

Upon energization of relay coil JJ in the manner previously explained, relay contacts JJ5 (Fig. 2a) are closed and upon closure of cam contact CC28, a circuit is completed as follows: line 301, through XC9 contacts now at rest and closed, through the normally closed AK1 contacts, through cam contacts CC28 now closed, through the normally closed ML27 contacts, through the now closed JJ5 contacts, through the stepping magnet 340SA to ground, thus energizing the stepping magnet 340SA. Upon energization of magnet 340SA, the stepping switch arms SA of the cycle controller are advanced from normal contact position to the first contact position (Fig. 2a). The stepping switch is of the type shown in the patent to Bohlman, No. 1,569,450. The first contact position is that which is in circuit with contacts AD*t*5, and AD*u*5. The energization of relay coil JJ will have closed its contacts JJ3 and upon closure of cam contacts CC3 and CC26 which close at the same time (see Fig. 4), current will flow from line 301, through cam contacts CC3, through JJ3 contacts, through the AD*u*5 contacts now in closed position as brought about by the energization of the AD*u* magnet in the manner previously explained, down through the wire 326, through the coil CS*d* of the column shift relay to ground. A circuit is also completed through the contacts AD*t*5, through the line 327 to the column shift relay magnet CS*c*, back to ground. The energization of CS*d* will close its related column shift contacts CS*d*2—7 shown in Fig. 2*j* and direct the entry of the multiple related to the units order of the multiplier in the proper columns of the RD accumulator. The energization of the CS*c* will close its related column shift contacts CS*c*2—6 (Fig. 2*j*) and direct the entry of the multiple pertaining to the tens order of the multiplier into the proper columns of the LQ accumulator.

Concurrently with the energizing of the above mentioned column shift magnets CS*d* and CS*c*, current supply is afforded by lines 326, 327 (Fig. 2a) to the units and tens common segments of the MP readout MPR (Fig. 2a). With the problem under consideration (see Fig. 9), the multiplier amount is 147 so that the brush in the units order of MPR will stand on 7 and the brush in the tens order will stand on 4. With the brushes in these positions, the 7 brush in the units order will allow current to flow to the 7X multiple selecting relay. The circuit back to ground is through AK27 relay contacts now closed. The brush standing on the 4 spot of the tens order will also permit energization of the 4XX multiple selecting relay. The respective multiple selection relays X and XX have stick contacts such as 7X1 and 4XX1 which, when closed, establish stick circuits which not only maintain their related multiple selecting relays energized but also maintain the selected column shift relays energized. The stick circuit for the X relay is via line 331 which extends back to line 301, through cam contacts CC15. The stick circuit for the XX relays is via line 330 which connects to line 331.

With the above mentioned multiple selecting relays energized, the related contacts such as 4XX2—5 and 7X2—5 (Fig. 2*f*) will become closed and a readout for the four multiple will be permitted from the readout section of MLR4—8 with the entry of such four multiple into LQ. The transmission of impulses from the contacts 4XX2—5 is via a group of lines generally designated 332 which extend to contacts AK14—17 (see Fig. 2*j*) in the position shown, and the impulses will be directed from these contacts through the now closed CS*c*2—6 column shift contacts, through the AK18—21 contacts in the position shown, wires 708, through the AL2—7 contacts in the position shown, through the 313LQ accumulator magnets, to ground. The seven multiple will be read out from the MLR7 and the impulses will flow through the 7X2—5 contacts over a group of lines designated 333, through contacts DD2—5 (Fig. 2*j*) which are now in the position shown, a group of lines 386, through the CS*d*2—7 contacts, through the group of contacts DD6—11 in the position shown, via a group of wires designated 709 down through the 313RD accumulator magnets, to ground.

When CC28 (Fig. 2a) again closes in the next machine cycle, a circuit is again completed through stepping magnet 340SA in the manner previously explained, through JJ5 contacts, thus causing the stepping magnet to advance the stepping arms one more step. Then, when cam contacts CC3 and CC26 again close, a circuit will be completed through column shift relay CS*b* as follows: from line 301, through cam contacts CC3, through relay contacts JJ3, through the right SA contact arm at the second position, down through now transferred AD*u*4, through AD*h*4, thence via line 326', through CS*b* relay coil to ground. Concurrently, a circuit is also completed through CC26, through transferred AD*t*4 contacts, through closed AD*th*3, AD*ht*2, to AD*tm*1 contacts, over through the H relay coil, to ground. Also, when the circuit was completed through CS*b*, a branch circuit was completed through the MPR readout hundreds order segment through the 1X multiple selector relay coil, through AK27 contacts to ground. The 1X relay, upon energizing, sets up its stick circuit through the 1X1 points in a manner previously described. The energization of the H relay causes the H1 contacts providing a stick circuit therefor as follows: from line 301, through contacts MP4, through relay contacts H1, through H relay coil to ground. The operation of the 1X relay closes the 1X2—5 relay points and causes entry of the "one" multiple of the multiplicand into the RD accumulator in the same manner as the "seven" multiple was entered into the RD accumulator, but in shifted relation, as affected by the now closed CS*b*2—5 contacts.

It will be understood that with the foregoing computation, if the multiplicand amount is 358, a seven multiple of that amount would be 2506, the four multiple would be 1432 and the one multiple would be 358. Accordingly, there would be concurrent entry of 1432 and 2506 respectively, into LQ and RD. 1432 would be entered into LQ in a tens relationship. (See Fig. 9.) In the following cycle, the one multiple or 358 would be entered into the RD accumulator in such shifted relationship that in effect it would be entered into the hundreds order position. The multiplying computation, so far as entry of selected multiples in RD and LQ is concerned, is now completed but it will be understood that with a machine of greater computing capacity, further multiple selecting cycles would follow. Assuming, however, that the computation is complete, the machine will now terminate multiplying selecting and entering operations and controls will be conditioned for the next step of the computation. This next step involves transfer of the amount in RD over into LQ to combine sub-products.

*Reset of ML receiving devices*

During this transfer cycle, there will be other operations effected (see Fig. 8) which causes the ML multiple receiving devices to be reset to zero and also to cause the stepping switch SA to be restored to its normal or non-advanced position.

Near the end of the last multiple entering cycle, cam contacts CC28 (Fig. 2a) close and again energize stepping switch magnet 340SA. The stepping switch arms will be advanced to the third contact position. Contacts AD$u$3 and AD$t$3 will be in shifted position and AD$h$3 will also be in shifted relation and all remaining cycle controller contacts will be in non-shifted position. Upon concurrent closure of cam contacts CC3 and CC26, a circuit will be completed through the KK relay as follows: from line 301, through the CC3 cam contacts, through relay contacts JJ3, through the left SA stepping switch arm in the third position, through the relay contacts AD$u$3, AD$h$3, AD$t$2, AD$m$1, through the KK relay coil, to ground. The energization of the KK relay sets up a stick circuit through KK1 contacts back through relay contacts MP4 to line 301. In the previous cycle, the H relay was energized and held energized so that we now have H5 and KK5, which are both shown in Fig. 2c, closed. Upon closure of cam contacts CC27, the 321ML relay coil and the CA relay coil will be energized in the following manner: from line 301, through cam contacts CC27, through relay contacts AF4, through relay contacts KK5 now closed, through relay contacts H5 now closed, through the closed AK6 contacts, through 321ML relay coil to ground. The circuit for the CA relay is from the H5 contacts, through the AK7 contacts, through the CA relay coil, to ground. The stick circuit for relay coils 321ML and CA is provided by their respective stick contacts ML25 and CA7, and cam contacts CC5.

The energization of relay coil 321ML causes a resetting of the ML accumulator units in the following manner: by the energization of relay coil 321ML, the contacts ML1—24 (Fig. 2d) are closed and the ML28 (Fig. 2e) contact is transferred. Complemental impulses are then sent to the ML accumulator magnets as follows: from line 301, through the now transferred ML28 contacts, to the subtraction or complemental impulse distributor 344. Complemental impulses are then sent out through the MLR units to the respective ML accumulator magnets, thus restoring the ML units to all nines positions. At the carry time in the cycle, a one impulse is entered into the units order of each of the ML accumulators as follows: from the line 324 which receives the elusive one digit impulse, through contacts ML24, through the AV23 contacts of the ML9 accumulator now closed, down through the 313ML accumulator magnet in the units order of ML9 to ground, thus causing a unit digit to be entered into the units order, and through the regular carry circuit the remaining orders of this accumulator are restored to zero.

During the last part of the machine cycle in which the ML receiving units are reset, cam contacts CC28 (Fig. 2a) close, thereby completing a circuit through the stepping relay restoring magnet 341SA as follows: from the line 301, through the now closed cam contacts XC9 which are at rest through the normally closed relay contacts AK1, through cam contacts CC28, through the now transferred relay contacts ML27, through the restoring magnet 341SA to the ground. As is customary in the type of stepping switches referred to, the energization of the restoring magnet will release the detent and allow the stepping relay contact arms to be restored to normal by means of a previously tensioned coil spring.

*Transfer from RD to LQ to combine sub-products*

During the same cycle in which the switch arms SA are restored, the CA relay was energized, and the CA1—6 contacts (Fig. 2j) were closed. A circuit is now completed from line 301, through RD2 contacts now in the position shown, to the 348 impulse emitter. Impulses are then sent out through and under control of the RDR readout, through the normally closed contacts RD3—8 in the position shown, through the now closed CA1—6 contacts, line wires 108, down through the AL2—7 contacts in the position shown, through the 313LQ accumulator magnets, to ground, thus transferring the amount standing in the RD accumulator into the LQ accumulator. The LQ accumulator now contains the accumulation of the sub-products and therefore designates the complete product and which amount is retained in the accumulator for subsequent punching recording in the event that the computation has been found to be correct.

*Reset of RD and SP accumulators*

It will be recalled that contacts ML26 (Fig. 2b) are closed during the cycle of operation in which the ML receiving devices are reset to zero and near the end of this machine cycle, cam contacts CC42 (Fig. 2b) close to thereby close a circuit from the line 301, through cam contacts CC42, through Y6 contacts now closed, through ML26 contacts now closed, through relay coil AF, to ground. The energization of the AF relay coil sets up a stick circuit for itself back through the AF1 contacts, through cam contacts CC43 which close over to the next cycle (Fig. 4), to line 301. The energizaiton of the AF relay coil closes its contacts AF5 and since these contacts are still closed at the beginning of the next machine cycle, they will cause the energization of the reset coils 321RD and 321SP (Fig. 2c) by circuits described as follows: during the initial part of the machine cycle cam contacts CC27 (Fig. 2c) close, thereby closing a circuit from the line 301, through cam contacts CC27, contacts AF5 now closed, contacts BG6 now in the position shown, contacts AK8 in the position shown to the relay coil 321RD. A circuit is also closed from the relay contacts AF5 to the relay coil 321SP to the ground. With the concurrent energization of the relay coils 321RD and 321SP, they will be held energized by their respective stick contacts RD1 and SP1, the stick circuit extending through cam contacts CC5 to line 301.

The opening of the relay contacts AF4 (Fig. 2c) prevents a repeated energization of 321ML and CA relay coils which would be occasioned by the transmission of an impulse by cam contacts CC27 through other relay contacts which are later closed.

The energization of the relay coil AF causes the closure of its contacts AF2 (Fig. 2b) so that while such relay contacts are closed a circuit is closed from the line 301 through cam contacts CC49, through AF2 contacts now closed, through BG17 contacts now closed, to the relay coil AK. The energization of the AK relay coil causes closure of stick contacts AK4 which sets up a stick circuit for the AK relay coil as follows: line 301, through cam contacts FC12 now closed in the position of rest, the relay contacts AK4 now closed, through BG17 contacts now closed, through the AK relay coil, to the ground.

The energization of the reset relay coil 321RD causes a reset of the RD accumulator in the following manner: By the energization of the relay coil 321RD, RD2 contacts (Fig. 2j) and RD3—8 contacts (Fig. 2j) are transferred. A circuit is now completed from the line 301, through the now closed RD2 contacts now transferred, through the complemental impulse distributor 350 which will send complemental impulses to the RDR readout and, under control of the latter, these impulses are transmitted through the transferred RD3—8 contacts, then by a series of lines 709 to the 313RD accumulator magnets, to the ground. The elusive digit impulse is transmitted as stated by a circuit from the line 301, through cam contacts CC16, line 324, through RD9 contacts now closed, AV50 contacts now closed, to the units order 313RD accumulator magnet. As outlined in Fig. 8, this operation of the machine will cause the resetting of the RD accumulator and during this same machine cycle, the SP accumulator is reset and the same time the amount standing in the SP accumulator is transferred into the PQ accumulator as a tens complement and the circuits for effecting these operations will now be described in detail.

*Reset of SP accumulator*

The energization of relay coil 321SP causes the contacts SP4—9 (Fig. 2i) to be closed and also contacts SP11 (Fig. 2i) are closed as well as contacts SP3 (Fig. 2h). A circuit is then completed from line 301, through SP11 contacts to the complemental emitter 375. Complemental impulses are then sent out through and under control of the SPR readout device, through SP4—9 contacts, through a group of lines designated 704, to a group of lines 702 (Fig. 2h), through the 313SP accumulator magnets, to ground, thus causing the SP accumulator to be reset. The elusive one for the SP accumulator is entered by the previously mentioned elusive one digit impulse transmitting wire 324 (Fig. 2h) through contacts SP3, contacts AV32, to the units order accumulator magnet 313SP, to ground.

*Subtractive transfer from SP to PQ accumulator*

The energization of 321SP relay also causes SP2 (Fig. 2c) contacts to close and complete a circuit through the AH relay coil as follows: from line 301, through normally closed BG7 contacts, through SP2 contact now closed, through the AH relay coil to ground. The energization of AH relay coil causes the AH4—9 (Fig. 2j) contacts to close. Before going further, it is also stated that when the AF relay was energized to close contacts AF7, in the previous cycle cam contacts CC48 (Fig. 2c) closed, and with AF7 contacts closed, a circuit was completed from line 301, through cam contacts CC48, through AF7 contacts, through A4 contacts now in the position shown, through AG3 contacts, through AL relay coil, to ground. The energization of the AL relay coil sets up a stick circuit for itself back through AG3 contacts, through contacts A4, through AL1 contacts, to line 301. Thus, the AL relay is energized, and the AL2—7 (Fig. 2j) contacts are transferred and held in such position and since contacts AH4—9 (Fig. 2j) are closed, complemental impulses are also transferred from the SP accumulator into the PQ accumulator at the same time the the SP accumulator is reset, as follows: line 301, through the SP11 contacts, (Fig. 2i) to the complemental emitter 375, then through the SPR readout, through SP4—9 contacts now closed, via a group of lines 704 (up) and 703 (across), through the AE/1—6 contacts now closed in the position shown, through a group of lines 707 (down) (Figs. 2i and 2j) through the AH4—9 (Fig. 2j) contacts, through the transferred AL2—7 (Fig. 2j) contacts through the 313PQ accumulator magnets, to ground. This will transfer the digits as the nines complement into PQ, all orders at the right receiving "9's" (see Fig. 9), noting —641999— in PQ.

The elusive one is entered into the units order of the PQ accumulator in the following manner: from line 301, through CC16 (Fig. 2j), wire 324, through the now closed SP13 contact, BG19 contacts, through the now closed AV38 contacts, down through the units order 313PQ accumulator magnet, to ground.

*Transfer from MP to ML receiving units*

During the same cycle in which RD and SP are reset and SP subtractively transferred to PQ (see Fig. 8), the amount standing in the MP accumulator is read out and transferred to the ML receiving units previously cleared out, and in the proper denominational relationship. It will be recalled that, when the MP entry was made a setup was made in the TT (Fig. 2h) electromechanical relay. This was stored in the AR (Fig. 2i) relays. In the present example, there was no setup made in the TT relays because there were no zero digits at the left of the first significant digit in the MP amount. It will also be recalled that due to the absence of zeros at the left of the MP amount, the normal closure of the relay contacts TTh1 (Fig. 2i) causes the energization of the AYh relay, and correspondingly, the closure of the relay contacts AYh1 (Fig. 2i), causing energization of the ARh relay. Summarizing, in accordance with the zeros at the left, the relays TT are energized, resulting in the energization of the AY relays and the latter in turn energize the AR relays. In the event that there was a zero at the left of the MP amount, the ARt relay would be energized.

With the AH relay (Fig. 2c) energized as previously stated, circuits are now completed to the ML receiving units as follows: from line 301, through the MM1 contacts (Fig. 2e), through the ML28 contacts, to the add impulse emitter 314. The use of the emitter 314 for transmitting impulses under control of the MLR1—2, MLR3—6, MLR4—8, MLR5, MLR7, and MLR9 receiving units was previously described. As is evident from Figs. 2e and 2i, the MLR9 readout has ten wire connections to the corresponding transverse digit segments of the supplemental MPR readout shown in Fig. 2i, so that impulses from the emitter 314 are also transmitted to this supplemental MPR readout, and as shown in Fig. 2i are transmitted through the ARh2—4 contacts (Fig. 2h) through the AH1—3 contacts, wires 720, through the K1—15 contacts, through the series of 313ML accumulator magnets, to ground.

Figure 3:
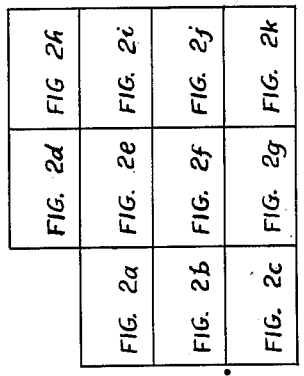
Fig. 3 shows the manner in which Figs. 2a to 2k should be assembled.

At the time the AF relay coil was energized, the AF6 (left in Fig. 2b) contacts were transferred. Thus, when cam contacts CC29 close, a circuit will be completed to the clutch control magnet 312 for initiating the operation of the XC cams (see Fig. 1) as follows: from line 301, through cam contacts CC29, through the now transferred AF6 contacts, through the clutch control magnet 312, to ground. The energization of the clutch control magnet 312 again starts the XC cam shaft into operation for three machine cycles. Thus, during the first machine cycle of the XC operating cams, the K1—15 contacts are closed as previously stated so that the impulses from the supplemental MPR readout (Fig. 2i) are directed to and through the K1—15 contacts, to the ML1—2, ML3—5, ML5, ML7 and ML9 accumulator magnets. Thereafter, during the third machine cycle of the operation of the XC cams, multiples of the MP amounts which are entered in the ML receiving units will be built up in the manner previously described, as is outlined in Fig. 3.

*Transfer of amount in LQ accumulator to RD accumulator so as to be used as a dividend amount*

It will be recalled that during the end of the machine cycle in which the ML representing devices are reset, the AF relay (Fig. 2b) is energized when cam contacts CC42 close. Cam contacts CC43, it will be recalled, are the stick cam contacts and from Fig. 4 it will be observed that cam contacts CC45 close during their closure, and obviously, with relay contacts AF8 (Fig. 2g) and relay contacts AF9—14 closed, the closure of cam contacts CC45 will send an impulse to the 0 segments of the LQR readout to selectively energize the BD electromechanical relays (Fig. 2f) according to the zeros at the left of the LQ amount as follows: from line 301, through contacts AF8, through cam contacts CC45 to the zero segment of the LQR and wherever a brush is standing thereon to lines leading to the now closed AF9—14 contacts, through the selected BD relay coils, and through the BDa relay coil to ground. The BD relays are electromechanical relays and when their contacts are closed they are tripped closed and remain closed until mechanically restored. Therefore, the energization of relay coil BDa causes BDa1 contacts (Fig. 2k) to be closed and remain closed to complete a circuit through one of the BE relay coils upon closure of cam contacts XC12 (Fig. 2k) which close in the second machine cycle of the XC cam operations, as is evident from Fig. 6. The particular BE relay which is energized is dependent upon the number of zeros to the left of the first significant digit of the amount in the LQ accumulator. In the example, assumed, the product amount is —052626— and therefore there is only one zero at the left. Therefore, the relay coil BDht is energized, causing the BDht1 contacts to be tripped and remain closed, this being also true of the relay coil BDa and its relay contacts BDa1 shown in Fig. 2k. A circuit is completed from line 301 (Fig. 2k), through contacts BDa1, through the closed BG16 contacts, through cam contacts XC12, through the now transferred and closed BDht1 contacts, through the normal and now closed BDtt1 contacts, through the BEtt relay coil to ground. The energization of relay coil BEtt causes the BEtt1—5 contacts (Fig. 2k) to close. When XC6 cam contacts (Fig. 2b) close in the second machine cycle of the operation of XC operating cams (see Fig. 6), a circuit is completed as follows: from line 301, through cam contacts XC6 (Fig. 2b), through the BG5 normally closed contacts, through relay contacts KK4, through the relay contacts H4 now closed, through the AP relay coil, to ground. The energization of the AP relay coil causes the AP1 contacts (Fig. 2g) to close and connect the line 301 to the emitter 322. Impulses are then sent out by this emitter through the LQR readout, through a group of lines 712, and 713 (Fig. 2k), through the BEtt1—5 contacts now closed, through a group of lines designated 716, through the 313RD accumulator magnets (Fig. 2j), to ground.

Figure 8:
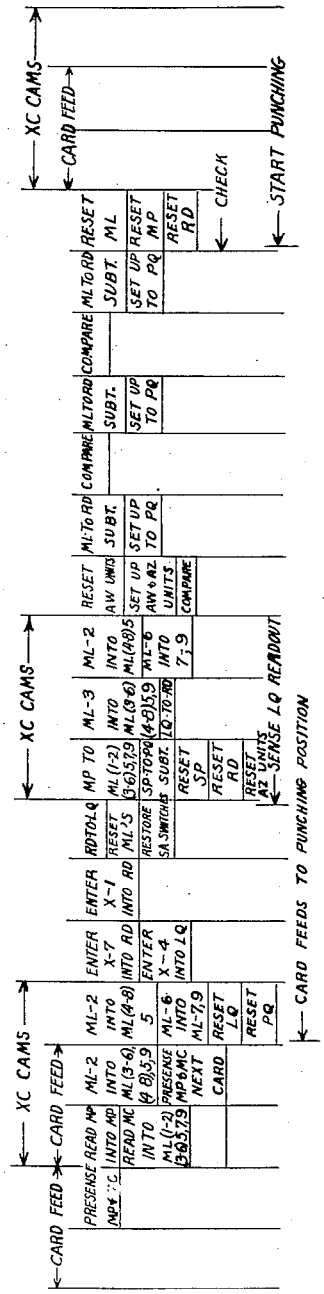
Fig. 8 is a sequence of operation diagram showing the sequence of events in carrying out the calculation performed by the machine.

With regard to the statement that contacts KK4 and H4 are closed, by reference to Fig. 2a, it will be observed that the stick circuits for both the KK and H relays are through their respective stick relay contacts and through relay contacts MP4, and therefore, these relays and their respective contacts remain closed until the MP accumulator is reset. As shown in Fig. 8, this does not occur until punching operations are initiated and in the cycle of machine operations now being described, the contacts KK4 and H4 are closed to enable the energization of the relay coil AP.

*Summary*

Figure 9:
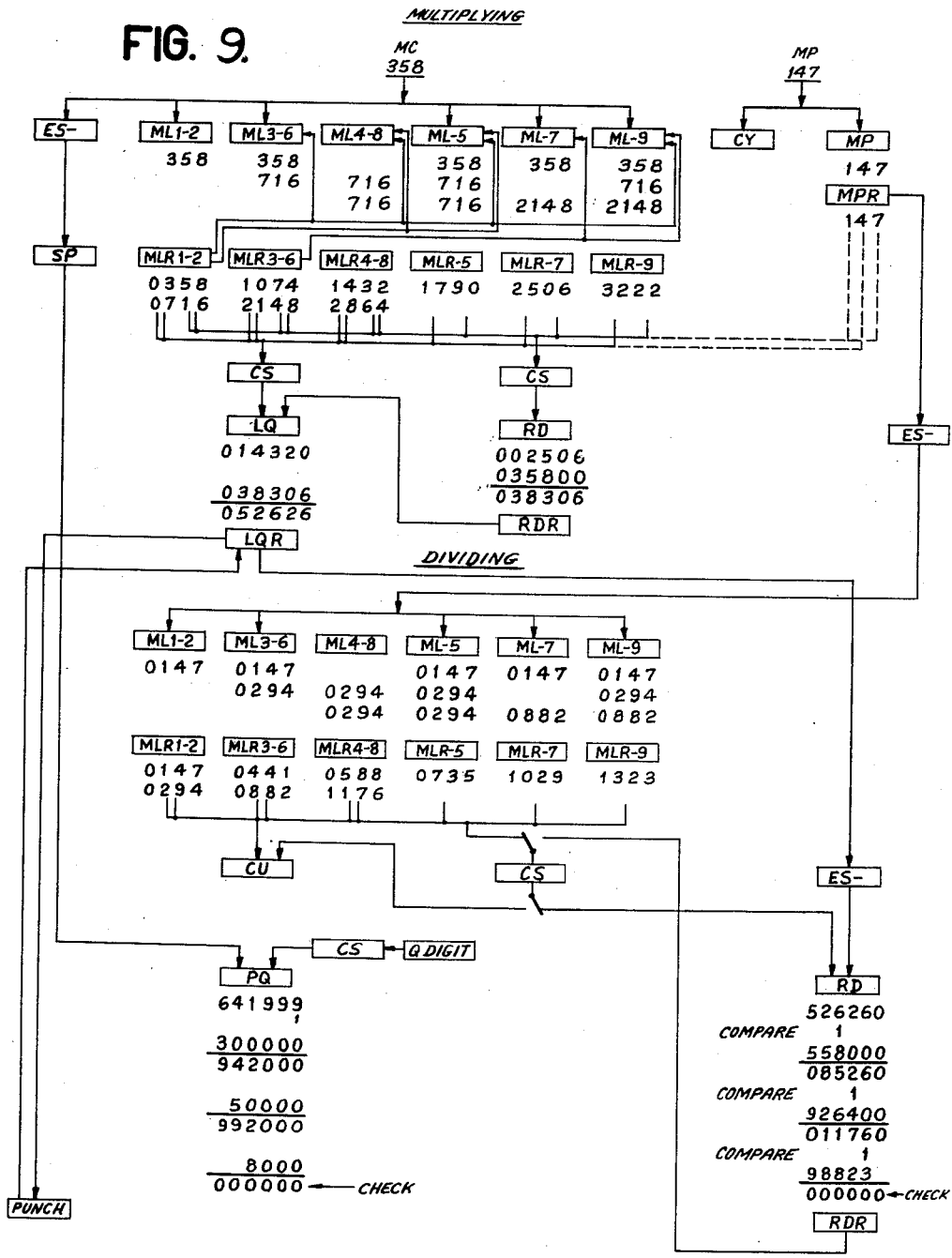
Fig. 9 is a flow diagram of the computation performed by the machine. This shows an illustrative problem and the manner of effecting entry into the various receiving devices and how the machine performs the computation.

Summarizing the operations of the machine which have been described up to the present time, the multiplicand amount 358 has been multiplied by the MP amount 147 and the product —052626— has been entered into the LQ accumulator. (Fig. 9.) The ML receiving units have been cleared out and in these latter the multiples of the MP amount 147 have been set up. The product amount in the LQ accumulator has been transferred to the RD accumulator, as is evident from Fig. 28, so that the amount entered therein in shifted denominational relationship can be utilized as the dividend. While this transfer has been effected from the LQ accumulator to the RD accumulator the amount has been retained and is therefore, still set up on the LQR readout for the subsequent punching operations in the event it is found that the computing operation has been correctly performed. The MC amount 358 was also entered in the SP accumulator and read out therefrom subtractively so that the tens complement was entered into the PQ accumulator which, in the division operations now to be described, constitutes the quotient digit receiving means.

*Dividing operation to check previous calculation*

The machine is now ready to initiate a division operation to divide the dividend amount —526260— by the MP amount 147 used as a divisor and enter the quotient digits derived in the PQ accumulator; the above to check the previous multiplying computation to determine whether it has been correctly performed.

The following relays are still energized—F, G, AK (Fig. 2b), JJ and AL (Fig. 2c).

*Reset of AW and AZ comparing units*

The previous energization of the AK relay (Fig. 2b) occurred, it will be recalled, during the cycle of operation in which the ML receiving units are reset, and the energization of this relay caused the AK3 relay contacts (Fig. 2c) to close, thus completing a circuit in this cycle through the comparing unit clutch magnet 342 which is maintained energized as long as the AK relay is maintained energized. The maintained energization of the clutch magnet 342 (Fig. 1a) releases a clutch to place the drive shafts 97 of the CU comparing units in timed operation with shaft 50, there being three cycles of operation effected during the multiplying operation and also during the dividing operation.

At the end of the third cycle of operation, XC9 cam contacts close (Fig. 6) and with relay contacts AK1 (Fig. 2a) now transferred, a circuit will be completed when cam contacts CC9 close from line 301, through cam contacts XC9 (Fig. 2a) now closed, through AK1 contacts now transferred, through cam contacts CC9, to and through the 321AW reset coils, to ground, thus causing the 321AW reset magnets of Fig. 14 of Patent No. 2,315,686 to be energized and the AW side of the comparing units to be reset.

Also upon the previous LQ reset, the LQ3 contacts (Fig. 2a) were closed so that current will be supplied through the cam contacts C17 when they close, through relay contacts LQ3, to the divisor reset coils 321AZ of the divisor comparing units (see Fig. 14 of Patent No. 2,315,686), thereby energizing them during the LQ reset cycle (Fig. 6). This will release all the divisor side sections and allow them to be restored during the first cycle of the multiplying operation so as to be then in a position to receive a subsequent setting of the divisor multiples thereon.

Also, during the last multiplying cycle of operation, a circuit is also completed upon the closure of cam contacts CC9 as follows: from line 301, through cam contacts XC9 (Fig. 2a) closed in the third cycle of operation of the XC operating cams, through the transferred AK1 relay contacts, through cam contacts CC9, thence via line 700 and through all of the 9CU1, 8CU1, etc. transfer contacts now in the position shown, and finally through the 1CU1 contacts, through the JJ4 relay contacts now closed, through LL relay coil to ground. LL, once energized, is provided with a stick circuit extending back to line 301, through stick contacts LL1 and cam contacts CC13. After the foregoing stick circuit is established, cam contacts CC14 close and establish a circuit through the Y3 relay contacts now in the position shown, to energize a magnet 340SB of the SB stepping switch. With magnet 340SB energized, the four switch arms SB1, SB2, SB3 and SB4 are stepped to the first contact position.

Shortly after the switch arms just referred to of the stepping switch have advanced to this position, a circuit is completed from the line 301, through relay contacts Y2 now closed (Fig. 2a), through cam contacts CC11, through LL2 contacts now closed, through the switch arm SB3, through the BB relay coil, and to ground. A branch circuit is also established through switch arm SB4 to energize the relay coil DD. With coils BB and DD energized, they are maintained energized by their respective stick contacts BB1 and DD1. The stick circuit extends back to line 301 through cam contacts CC10, through relay contacts Y2 to line 301. Shortly after the switch arms of the stepping relay have advanced to the first contact position, a circuit is completed from the line 301, through the relay contacts Y2 now closed, through cam contacts CC8, through the stepping switch arm SB2 now in the first contact position, through the CSa column shift relay coil, and to ground.

It may be explained that the column shift relay CSa and relay coil DD cooperate to control the readout of the dividend comparison portion of the RD accumulator readout and contacts BB are utilized to control the readout of the various divisor multiples from the MLR readout devices.

The manner in which a comparison portion of the dividend is set up on the comparing units will now be described. It will be understood that the comparison portion of the dividend includes a selected number of columns. The number of columns selected is determined at this time by the CSa relay. Referring to Fig. 2i, a circuit is completed from line 301, through RD2 contacts now in the position shown to the add emitter 348. With such emitter in circuit, impulses are emitted through RDR, through the contacts RD3—8 now in the position shown, through the now shifted DD6—11 contacts, through the now closed CSa2—4 contacts, via lines 386 to the shifted DD2—5 contacts and via lines 387 (see also Fig. 2f) to the dividend side comparing magnets generally designated 1AW, 2AW, etc.

It will be understood that the comparison portion of the dividend is set up in multiple in the comparing units, that is to say, there are nine identical setups of the comparison portion of the dividend in order that there can be a comparison between each setup and the nine different divisor multiples. In the problem under consideration, the comparison portion of the dividend which was set up is the amount of 526 (see also Fig. 9). The setup of the multiples of the divisor on the other side of the comparing unit sections will now be described.

It has been previously explained how relay coil BB (Fig. 2a) becomes energized, with such relay coil energized, all of the contacts BB2—37 (Fig. 2e) become closed. The add emitter 314 (Fig. 2e) is placed in the circuit in the following manner: from line 301 through the non-shifted MM1, MP10, ML28 contacts, to the emitter 314. Such add emitter will transmit impulses to and through all of the MLR readout devices and the multiple amounts available on such readouts will be individually transmitted through the now closed BB2—37 contacts, to the various divisor multiple comparing magnets 1AZ, 2AZ, 3AZ, etc. It will be understood that the divisor multiple side of the comparing units will receive setting of the different divisor multiples. The comparing units operate in the manner previously explained to make suitable settings of the brushes upon these comparing conductors.

Having then entered both the dividend comparison portion in a multiple manner into the comparing units and having entered the various multiples of the divisor in the other side of such comparing units, the brush devices of the comparing units receive their settings in the manner previously explained to indicate a greater than, an equal to, or a less than condition.

Referring to Fig. 2f, it will be noted that comparing unit commutators are shown as sectionalized one for each multiple. For each section there is an associated relay coil such as 9CU for a 9 multiple and 8CU for an 8 multiple and son on. The brush section of the comparing devices is adapted to prevent energization of all magnets relating to multiples which are higher than the comparison portion of the dividend, and to permit energization of magnets related to multiples equal to or less than the comparison portion of the dividend.

With the problem of Fig. 9, the magnets which will be energized are relay magnets 1CU, 2CU and 3CU. The circuit energizing these magnets is from line 301 (Fig. 2f), through cam contacts CC12, through DD12 (now closed), through the one's, two's and three's multiple comparing sections, through the 1CU, 2CU, 3CU relay coils to ground. At this point, it may be explained that if the 4 multiple was the selected multiple, the 4CU coil, the 3CU coil, the 2CU coil and the 1CU coil would be energized and all higher number magnets above 4CU would not be energized.

During a comparing cycle which takes a single machine cycle the setup of the comparison portion of the dividend and of all the divisor multiples is made in the first portion of the comparing cycle. Immediately after the setup is made and in the same machine cycle, testing is effected. Testing is done concurrently for all multiples.

Referring now to Fig. 2a, the energization of relay coil ICU, 2CU, 3CU will have shifted relay contacts ICU1, 2CU1, 3CU1 to the reverse position from that shown and upon closure of CC9, current flows through the non-shifted 9CU1—4CU contacts, 3CU1 shifted contacts to and through the 3X multiple selecting relay and through the MM relay to ground. The multiple selecting relay 3X is maintained energized through stick contacts 3X1, the stick circuit extending back by line 331, through CC15, to line 301. It may be mentioned that this 3X relay coil is energized in the comparing cycle, just after the commutator test is made, and that such relay is maintained energized through a portion of the next cycle, to select the three multiple which is to be read out from the MLR3 device, and such multiple is to be subtracted from the dividend comparison portion of the divisor. The 3X multiple selecting relay also selects a related quotient digit for entry into the quotient receiving device LQ. Relay coil MM is maintained energized as long as the 3X coil is maintained energized being in circuit therewith. Previously when subtractive entries were made for resetting purposes the elusive one was introduced into the accumulator to bring the all nine setting of the accumulator wheels to a zero setting, after the complementary entry. In subtracting the divisor multiple, however, the elusive one entry is made during a comparing cycle. In this connection, it is to be noted that such elusive one is only introduced into the RD accumulator in the event that a multiple is to be subtractively introduced into such accumulator in the following cycle. If no such multiple is to be introduced, the entry of such elusive one in the comparing cycle is suppressed.

At the carry time in the comparing cycle, the carry impulse flows from line 324 (Fig. 2j) through the now closed MM2 contacts, through the AK11 contact now in shifted position, through the CSa10 contacts now in shifted position, to and through the 313RD accumulator magnet in the thousands order. It may be explained that the order in which such entry is made is selected under control of coil CSa in this instance by the CSa10 contacts. Such carry impulses for subsequent steps of the computation thereby will be introduced in other orders.

It is to be understood that if there was no "going" multiple for any given comparison portion of the dividend that no elusive one entry would be made. Such entry is suppressed because of the fact that in the event that no "going" multiple is found on test none of the X magnets will be energized because none of the ICU to 9CU relays will be energized. With no X coil energized, there will be no energization of coil MM and accordingly with MM deenergized the MM2 contacts will remain open and no elusive one entry can be effected. On a comparing cycle with a relay coil such as 3CU energized, the energizing circuit to coil LL (Fig. 2a) will be interrupted since a shift of contacts 3CU1 cuts off the circuit.

Unless LL is energized, it is impossible to energize the stepping switch magnet SB. All of the SB switch arms remain on their first contact position and inasmuch as contacts LL2 are open even though cam contacts CC11 close, there will be no energization of either BB or DD. However, relay coil CSa will be energized again under control of CC8 on the next machine cycle following the above described comparing cycle. Accordingly, the CSa2—4 contacts (Fig. 2j) will be again closed on the following machine cycle. After the comparing cycle, in such cycle, the relay MM is maintained energized as explained before. Accordingly, relay contacts MM1 (Fig. 2e) are shifted to reverse position from that shown and a circuit will be established from line 301, through the shifted points of MM1 contact to the subtract emitter 344. Such emitter will emit 9's complemental impulses through the MLR3 readout only. Impulses flow out of this readout, through the 3X2—5 contacts which are maintained closed by the energization of 3X relay during this cycle. 9's complementary impulses respective of the 9's complemental 441 i. e., 558 flow over the lines 333 (Fig. 2f) through the contacts DD2—5, (Fig. 2j) in the position shown, via the lines 386, through the now closed CSa2—4 contacts, through the non-shifted DD6—11 contacts, via lines 709, and through the proper columnar orders of the RD accumulator energizing the proper 313RD magnets. This operation will deduct the amount of 441 from the amount of 526260. It will be recalled that the elusive one entry through the accumulator has been previously made and the regular transfer mechanism of the accumulator will provide for transfer to higher orders when required.

*Entry of quotient digit*

With the multiple selecting relay coil 3X energized, a supplemental contact 3X6 (Fig. 2j) will be closed. The RD2 contact is as shown and thus by means of add emitter 348 a selected digit impulse will be entered through the LQ accumulator in the proper order as follows: line 301, through RD2 as shown, to the 348 emitter. Impulses are thus sent out through the X6 contacts. In this instance the 3X6 contact, through the AK10 contacts (now closed) through the AL8 contacts now transferred, through the CSa8 contact, down through the 313 PQ magnet in the highest order position to ground. Thus causing a "3" to be entered in the PQ accumulator.

On the quotient entering and subtracting cycle inasmuch as the DD relay coil was not energized, contacts DD12 (Fig. 2f) are in open position accordingly, even if CC12 contacts close there will be no energization of any of the CU relays. With none of such coils energized, the ICU1, 2CU1, etc. contacts of Fig. 2a remain in the position shown and upon closure of CC9 the current supply is afforded through the JJ3 contact to energize relay coil LL. Relay coil LL when energized will close its stick contacts as before described and there will be another energization of stepping relay coil 340SB under the control of contacts CC14. Accordingly, switch arms of SB will step to the second contact position. After comparison is made with one dividend comparison portion at the time the multiple selecting relays are energized under control of contacts CC9, a supplemental circuit is established through coils 321AW to ground. These coils are the reset coils of the comparing unit corresponding to the comparison portion of the dividend (see Fig. 14 of Patent No. 2,315,686). With such coils energized, the dividend comparison side of the comparing units become restored so that a new dividend comparison portion can be introduced therein. It will be understood that the divisor multiple side of the comparing unit retains the divisor multiples during all the deducting and quotient entering operations. Referring to Fig. 9, the RD accumulator now has standing in it the remainder amount of 085260. There is now to be another comparison operation and with such comparison operation there is a different comparison portion of the dividend selected for comparison. In Fig. 9, it will be noted that the first comparison which has been previously described pertains to the three extreme left hand orders of the dividend and the second comparison pertains to the four extreme left hand orders of the dividend. There must accordingly be a column shift to take a different comparison portion of the dividend from the RD receiving device.

It has been previously explained how the SB stepping switch was brought to the second contact position. It was also explained that the relay coil LL was energized. With relay coil LL energized, relay contacts LL2 are closed and accordingly upon closure of cam contacts CC11 a circuit is completed through a switch arm SB4 of the stepping switch to energize relay coil DD. It will be noted that there is no energization of relay coil BB because the second contact of the stepping switch arm SB3 and those thereafter are not wired in circuit to relay coil BB. With relay coil DD energized, it is maintained energized in the customary manner and following its energization, cam contacts CC8 close and a circuit is established to energize column shift coil CSb. It will be noted that relay coil CSa is not now energized since the switch arm of the stepping switch is in the second contact position. With the coil CSb and relay coil DD energized, their associated contacts shift to a reverse position from that shown in the circuit diagram.

Referring to Fig. 2j, with coils CSb energized, contacts CSb2—5 close and there is a new readout relation established with RDR. The readout relation is now such that the four left hand columns of RDR are selected for readout and for controlling the entry into the dividend side of the comparing unit. The entry circuit is similar to the one just previously described when the first three left hand digits of the dividend were entered into the comparing portion of the comparing unit. With the exception that instead of the circuit being completed through the contacts CSa2—4 the circuit is now completed through the contacts CSb2—5.

It will be recalled that the divisor multiples still remain set up in the divisor side of the comparison unit. There is now a further comparison effected into the comparison commutators and circuits of the comparing unit bring about an energization of all of the CU coils from 1CU to and including 5CU and coils 6CU, 7CU, 8CU and 9CU remain deenergized. With the 5CU comparison relay coil energized, the related relay coil 5X (Fig. 2a) becomes energized under the control of CC9, over the circuit previously described but which in this instance is completed through the now shifted 5CU1 contacts to the multiple selecting relay 5X. When relay coil 5X is energized relay coil MM likewise becomes energized in the manner previously explained. Both 5X and MM are held energized through the 5X1 stick contacts.

In the comparing cycle and at the carry time in such cycle, provision is made for introducing an elusive one into the RD accumulator into the fourth order from the left. Such elusive one entry is made generally in the manner previously explained except that at this time the CSb10 contacts are in shifted position due to the energization of CSb. With relay coil MM energized, the MM3 contacts are closed and a circuit is completed from line 324 at the carry time through MM2, through the now shifted AK12 contacts through the now shifted CSb10 contacts down through the hundreds order 313RD accumulator magnet. This will enter the elusive one in such order. On the following cycle the five divisor multiple is entered subtractively into the RD accumulator and the five quotient digit is entered in the proper columnar order of PQ.

Referring to Fig. 2f, energization of the 5X multiple selecting relay coil brought about as previously explained will close the 5X2—5 contacts. Energization of relay coil MM will shift MM1 (Fig. 2e) contacts to reverse position and place the 9's complementary emitter 344 in circuit with line 301. 9's complementary impulses flow from the 344 emitter through the MLR5 readout, out through the 5X2—5 contacts to the lines 333, through the non-shifted DD2—5 contacts, (Fig. 2j) through the CSb2—5 contacts, through the DD6—11 contacts to the four left hand accumulator magnets of the RD accumulator. This will enter the 9's complement of the 5 multiple of the divisor into such accumulator. Concurrently with the foregoing deduction operation, the 5 quotient digit is entered into the LQ. The energization of relay coil 5X will have closed contacts 5X6, (Fig. 2j). Add emitter 348 will now complete a circuit which will extend from line 301 through RD2 in the position shown, through the 5 spot of the add emitter 348, through the closed 5X6 contact, through the AK10 contact now closed, through the AL8 contact now transferred, down through CSb8, through the 313PQ accumulator magnet in the second order position from the left. This will enter the "5" quotient digit in such order of this accumulator and in the same manner the next quotient digit "8" is computed.

Referring now to Fig. 9, it will be noted that in the typical example there illustrated, the quotient is only carried out to three significant digits. The computation therefore is completed and termination of the computation is to be controlled by the place limiting device which is provided for this purpose.

*Place limiting device*

The machine also includes an automatic control which performs to automatically terminate quotient digit computing cycles of operation when the necessary number of quotient digits have been derived. This control is derived from the DT relays (Fig. 2i) which are selectively energized to close their respective DT2 contacts (Fig. 2a). The DT relays are selectively energized in accordance with the number of significant digits of the MC amount and in the present example, three digits are designated in the amount 358 so that, as previously stated, the DTh relay contacts are closed. (Fig. 2a.) If the computation was to be carried to a lesser number of quotient places, the DTu or DTt relays would be energized. Obviously, with a machine with a greater computing capacity, more relays of the DT type would be provided with the corresponding controls.

During the last multiple deducting and quotient digit entry cycle, just described, relay coil DD (Fig. 2a) will be deenergized and accordingly the DD12 contacts (Fig. 2e) will remain in open position and there will, accordingly, be no energization of the CU relay coils. With none of the relay coils energized, the ICU1 to 9CU1 contacts will remain in the position shown, so that, upon closure of cam contacts CC9 (Fig. 2a), relay coil LL will become energized. With such relay coil LL energized, the relay contacts LL3 (Fig. 2a) will be closed and upon closure of cam contacts CC17, a circuit will be closed from line 301, through cam contacts CC17, through relay contacts LL3, through the SB1 switch arm at the third contact position, through the DTh2 contacts, thence to the Y relay to ground. Relay coil Y, being energized, closes its stick contacts Y1 and the stick circuit is completed back to line 301, through relay contacts MP4.

The energization of the relay coil Y will have shifted relay contacts Y3 (Fig. 2a) to a reverse position from that shown at a time prior to the closure of cam contacts CC14. Accordingly, with such CC14 contacts closed, a circuit is completed through the now shifted contacts Y3, through the 341SB restoring magnet. With the type of stepping switch utilized and which is well known, this will release the stepping switch arms and allow them to return to the normal position shown in the circuit diagram. It may be noted that no circuits are inadvertently established to the stepping switch arms SB upon restoration because on restoration the Y2 contacts (Fig. 2a) are in open position. The foregoing restoration of the stepping switch and opening of contacts Y2 terminate further energization of the CS magnets, the BB and the DD magnets.

Reset of ML, MP, RD, accumulators

At this stage in the operation, relays H, KK and Y are energized and their respective stick contacts H3, KK3, and Y5 are closed (Fig. 2b) resulting in the energization of relay AN by closure of these contacts, which circuit is completed through these contacts and the normally closed BG4 contacts during the last quotient digit entry and divisor multiple deducting cycle. At the end of this cycle, cam contacts CC27 close (Fig. 2c), completing a circuit from line 301, through cam contacts CC27, through AF4 contacts, Y7 contacts now closed, AK6 contacts now transferred, through relay coil 321ML to ground, thus initiating a ML reset operation which occurs in the following cycle in the manner previously described.

It should be noted that the energization of relay Y opened contacts Y4 (Fig. 2b) and since contacts H2 and KK2 are now opened, the impulse transmitted by cam contacts CC42 which is earlier than for cam contacts CC27 (see Fig. 4) will be ineffective to energize relay coil AF, and hence AF4 contacts will be closed to enable the energization of relay coil 321ML.

It should also be noted that by the transferred contacts AK6 an impulse is also sent through AK8 contacts also transferred to the 321RD relay coil, energizing this simultaneously with the 321ML relay coil. In the manner previously described the RD accumulator is reset.

The impulse directed by cam contacts CC27 is also directed through relay contacts AN2 (Fig. 2c) to both the relay coils CY and 321MP, energizing both. The stick circuit for both of these relays is through stick contacts MP1, and cam contacts CC5 to line 301. Resetting of the MP accumulator is now effected by a circuit as follows:

Energization of 321MP relay coil closes contacts MP10 (Fig. 2e) and contacts MP7—9, and thus the circuit is closed from line 301, through contacts MM1 now normal, MP10 now closed, to the subtract emitter 344 so that impulses are sent through the MLR units to the respective ML accumulator magnets. In view of the wire connections from the MLR9 readout to the MPR supplemental readout in Fig. 2i, impulses are sent to this readout and under control thereof are transmitted by wires 705 (Fig. 2i), wires 706 (Fig. 2j), relay contacts MP7—9, accumulator magnets 321MP to ground. The elusive one digit impulse is transmitted by wire 324, through relay contacts MP6, relay contacts AV26, to the units order accumulator magnet 321MP.

The resetting of this supplemental readout MPR in Fig. 2i will also zeroize the MPR readout in Fig. 2a.

Test for zero status of RD and PQ

From the outline of the computation in Fig. 9, the addition of the quotient —358— to the tens complement of the MC in the PQ accumulator should bring this accumulator to zero. Likewise, the subtraction of the selected divisor multiples from the product amount in the RD accumulator should bring the RD accumulator to zero, and before the RD accumulator is reset, the PQR and RDR readouts are tested for the zero status, indicated in Fig. 8 by "CHECK."

Prior to the closure of cam contacts CC27 which initiates resetting of the RD accumulator, cam contacts CC46 close, and a zero test impulse is sent from line 301, through relay contacts AN3 (Fig. 2k) now closed, cam contacts CC46, though the PQR readout of the six brushes thereof are all at zero, through contacts AN11—16 to CQ coils, to ground. Also the zero impulse is directed by a wire 800 (Figs. 2k, 2j) though the RDR readout of the six brushes thereof are all at zero, and through AN5—10 contacts now closed, to the CDu to CDht relays, to ground. If both RDR and PQR are at zero, all the CQ and CD coils will be energized and all their respective CQ1 and CD1 contacts (Fig. 2k) will be transferred.

After cam contacts CC46 close, a circuit will be closed by cam contacts CC47 from ground, through cam contacts CC47, relay contacts AN4 now closed, serially through CQ1 contacts, thence through BG1 contacts now closed, serially through the CD1 contacts, BG3 contacts now normal, wire 717 (Figs. 2k, 2g) to relay coil A to line 301, thus energizing relay coil A.

The relay coil A closes its stick contacts A1, the circuit extending back through relay contacts A1, relay contacts LQ5, to ground. Relay contacts A2 are also closed and since cam contacts CC19 are closed when cam contacts CC47 are closed a circuit will be completed from line 301, through relay coil AB, relay contacts A2, cam contacts CC19, to ground. Energization of the relay coil AB causes closure of contacts AB1—11 (Fig. 2g) which in turn connects the punch selecting magnets 353 to the LQR readout.

Punching mechanism

At this point in the operation of the machine, the product derived has been found to be correct and the next step is to provide for punching the product result on the card and at this time the construction of the preferred form of punching mechanism will now be described.

The punching mechanism is of the customary successive column acting repetition punching type as generally used in machines of this class. It is generally of the form shown in Lee and Phillips U. S. Patent 1,772,186. Further changes made in this machine are shown in the Daly Patent No. 2,045,437 and for convenience are described below.

The mechanism of the punching section includes two card feed racks 581 and 582 (see Figs. 10 and 10a). Rack 582 carries an arm provided with card pusher fingers 583. The drive is derived from a motor PM which, through the reduction gear driving train shown, drives a shaft 584 which has a ratchet shaped clutch element 585 fixed on one end of it. Alongside of clutch element 585 is a gear 586 which meshes with the lower teeth of rack 581. Secured to gear 586 is a disk 587 which carries a member 588 provided with a ratchet shaped clutch tooth 589. Alongside of member 588 is another member 588b which lacks the clutch tooth. On member 588 is a pin 588c overlying an arcuate surface 588d of member 588b. The free end of member 588b is connected to a toggle member 590 by a link 591. Toggle member 590 is pivoted on disk 587 by a stud 592. The opposite end of toggle member 590 remote from its pivot 592 is connected to a spring element 593, which spring tends to hold the clutch tooth 589 out of engagement with the clutch teeth of element 585 and allows it to engage when toggle member 590 is shifted. For the purpose of effecting a clutching action, punch rack trip magnet 318 is provided, and the circuit for this magnet was previously traced. This magnet, when energized, attracts its armature and causes an arm 595 to engage a pin 596, (see Fig. 10a); (the extension of arm 592 is shown broken off in this figure for clarity) depressing member 588b and allowing member 588 to descend so that the tooth 589 engages with the ratchet 585. Upon such engagement the gear 586 will be driven in a counterclockwise direction substantially a complete revolution, shifting rack 581 to the left. This action will, through the card pusher shown in Fig. 10a, move the card from the R position to the R1 position. At the termination of the counterclockwise movement of gear 586, the tails 600 of members 588 and 588b will strike a projection 601 on a fixed plate to effect the disengagement of the tooth 589 from the ratchet 585. This action also restores the toggle parts to normal position.

The above driving action has wound up a spring in barrel 602. Upon disengagement of the clutch tooth 589, rack 581 returns to the right under the influence of the spring in barrel 602.

The driving train to the second card carriage rack 582 is as follows: Rack 581 has its upper teeth intermeshed with a gear 603 which has secured to it a member 604 having a single notch or tooth disposed in the plane of a pawl 605, which is pivoted on arm 606 fixed to the shaft 607. Arm 607 on its opposite end carries a gear 608 which meshes with the card carriage rack 582. Upon initial movement of rack 581 to the left, the block 611 will clear the pivoted camming element 609, allowing it slight counterclockwise motion so that 605 under spring action may rock and engage the tooth of member 604. Thereafter, driving will come from 581 through gear 603, through 604 to pawl 605 to 606 to shaft 607, so that the clockwise rotational movement will be imparted to shaft 607. This action will, through gear 608, traverse rack 582 to the right. The card carriage rack 582 will thus be shifted to the extreme right hand position, permitting the card pusher 583 (Fig. 10) to first ride over the surface of the card and ultimately engage back of the trailing edge of the card at the R1 position. Rack 582 has associated with it a spring drive comprising the usual spring barrel 612. This spring is wound up by the traverse of 582 to the right and is adapted to cause a movement of 582 to the left under spring action. The rack 582 also has associated with it an escapement mechanism 613 having a dog 614. This escapement is more fully described in Schaaff U. S. Patent 1,426,223 and in Lee and Phillips Patent 1,772,186. The usual controlling contacts 358 customarily used in machines of this class are also provided cooperating with the escapement parts.

Removably secured to the card carriage rack 582 is a skip bar 616 provided with a notched portion 617 which permits skip lifter lever 618 to descend when in the notch or to remain elevated when riding on the high part of the skip bar. When the skip lifter descends into the notch, it allows the dog 614 of the escapement mechanism to cooperate with the ratchet teeth of rack 582. With skip lifter 618 riding on the top of rack 616, the escapement will be disabled so that the card carriage rack 582 can traverse without stopping at each card column until the notch 617 is reached. Thereafter, there is an intermittent motion of the card carriage to the left under spring action and under escapement control. When the skip lifter 618 again rides out of the notch, the card carriage rack 582 takes its full excursion of movement to the left. The location of the beginning of the notch in the skip lifter lever bar determines the position for the beginning of punching the product in LQR, in the present example. When the escapement dog is lifted up, the contacts 358 are open as is customary in machines of this class. It may be explained that various forms of skip bars can be placed in the machine depending upon where punching the product is to be performed.

The punching machine proper need not be fully described as it is set forth in the Lee and Phillips patent above referred to. In brief, it comprises a set of punches 619, which punches are adapted to be depressed to perforate the card through interposers not shown but which are under control of punch selector magnets 353 shown only in wiring diagram Fig. 2g.

Referring to Fig. 10, there is shown disposed alongside of the card carriage rack 582 and fixed to the frame of the machine a block or strip of insulating material 620. Disposed in this block are a number of spots 621 of conducting material and on each side of these spots are common strips 622, 622a of conducting material. A suitable bridging piece or multiple brush assembly 623 is carried by the card carriage rack 582 and, as this card carriage rack moves, the bridging brush 623 is displaced and establishes circuit connections from the common strip 622 to one of the spots 621, depending upon the columnar position of the card carriage rack 582. In a similar manner, but differing from the Daly Patent 2,045,437, the bridging brush 623a establishes circuit connections from the common strip 622a to one of the spots 621 but two column positions behind the bridging brush 623. Spots 621 are preferably placed in two rows and inter-staggered as shown. This arrangement is usually termed a "reading strip."

Also securely fastened to the rack 582 are two bars 653 and 661 (Fig. 18). Slidably mounted on bar 653 is a block 654. Block 654 is so arranged to be positioned in a preselected columnar position. Fast to the block 654 is a protruding stud 655 (Fig. 17). In a like manner a block 662 is slidably mounted on bar 661 which also can be located columnarly along the bar. Also fastened to this block 622 is a protruding stud 663 (Fig. 13). Mounted between the members 657 and 658 which are in fixed relationship to the machine base are two members 656 (Fig. 15) and 664 (Fig. 12), each having respective depending extensions 660 and 666. Mounted on 656 is a bar 659 which is in juxtaposition to stud 655 so that, when stud 655 comes in contact with the bar 659 as shown in Fig. 17, the contact P9 will be closed by the action of 655 being rotated in a counterclockwise direction as viewed in Fig. 17, causing the member extension 660 to close the contact P9. In a like manner the protruding stud 663 will actuate the member 665 (Fig. 13) and cause the contact P8 to be opened by the depending extension 666, as shown in Fig. 14.

Referring now to Fig. 11, the sensing elements 651 of which there are ten, one for each of the digital values, are mounted in a strip of insulating material to be insulated from each other. Each sensing element 651 is electrically connected to the related wire connection 651a by means of the spring 652, which spring also imparts pressure to the sensing element 651, thus insuring an electrical contact to the common strip 650 through and when a hole appears in the sensed columnar position. The sensing elements 651 and its associated common strip 650 are located two columnar positions to the left of the punches 619, thus permitting the punched hole to be checked or verified when the card carriage has been stepped two columnar positions after the hole has been punched.

The energization of the A relay in the manner previously described also causes relay contacts A5 (Fig. 2i) to close to complete a circuit through the Zu and AAu relays as follows: from ground, through relay contacts A5, through BG14 relay contacts, through Zu relay coil to line 301. Also, a circuit is also completed from the relay contacts A5, through BG13 contacts, through the AAu relay coil, to line 301. It is explained that in punching a product derived by multiplying the AAu and Zu relay coils are always energized. The energization of relay coils Zu and AAu causes the Zu2–13 and the AAu2–13 contacts (Fig. 2g) to be closed. The closure of the Zu2–13 and the AAu2–13 contacts connects the common segments of the LQR readout to the plug sockets 355, further circuit connections to the commutator readout segments 621 being made by means of the plug wires connected between plug hubs 355 and the plug hubs 356 (see also Fig. 7).

Punching of the product amount is then effected in the following manner: from ground, through the LQ5 contacts now closed, through relay contacts A1, through the AG5 normally closed contacts, through contacts 358, through resistance #1, to the common segment 622 of the reading strip, thence by means of the common brush 623 to the particular segments and plugs which are plug connected to hubs 355. Punching is effected starting from the highest order, and for all orders up through the AAu2–13 contacts, through the Zu2–13 contacts, thence through the group of wires designated 712 (Figs. 2g, 2f), through the LQ readout segments, through the ABI–II contacts, and depending upon the brush position through the corresponding punch selecting magnet 353, through the P8 contacts now closed, to line 301. The energization of the selected magnet 353 causes a corresponding hole to be punched in the card. The contacts 358 (Fig. 10) act in the usual manner, opening the circuit just described and correspond to contacts 215 in the Daly Patent 2,045,437, allowing the punch selecting magnet 353 to be deenergized after punching. The energization of each selected magnet 353 causes a punch selector to be shifted which causes the punch contact 359 to be closed, thus completing a circuit to the punch magnet 360 as follows: from ground, through the LQ5 contact, through the A1 contacts, through the AG5 contacts, through contacts 358, through contacts 359 now closed, through the punch magnet 360, to line 301. The punch magnet 360 actually performs the work of punching the hole in the card. After the second hole has been punched in the card, the contact P8 is opened by the arrangement shown in Figs. 12–14, the settable member 662 being set on bar 661 to effect this. The card carriage is, however, spaced to the third column punching position. With contacts P8 now opened and relay contacts BA3 now opened, (Fig. 2g) no circuit can be completed through the punch selecting magnets 353 until the relay contacts BA3 are later closed. Closure of BA3 contacts is effected by the energization of BA relay in the following manner: from ground, through the LQ5 contact, through the relay contacts A1 through the AG5 contacts in the position shown, through the contacts 358, through the contacts BA2 which are normally closed, to the common reading strip 622a, through the common brush 623a to the segments 621 at the first or highest column position at the left. Thence up through the AAu2 contacts, through Zu2 contacts, and to a related wire 712, through the corresponding LQR readout segment of the highest order at the extreme left, through one of the ABI–II contacts, up through one of the group of wires designated 711 (Fig. 2f) to one of the punch checking brushes 651, thence through the hole in the card, to the common bar 650, through the BA relay coil, to the resistance #2 to line 301. Energization of the BA relay is effected when the brush setting of LQR corresponds to the hole analyzed in a corresponding order and being energized causes its contacts to be actuated. These contacts function in a definite sequence, that is, the BA1 contacts (Fig. 2f) first close. Shortly after BA1 contacts close, BA2 contacts (Fig. 2g) then open and shortly after BA2 contacts open BA3 contacts (Fig. 2g) close. Thus, upon energization of the BA relay coil, BA1 will first close and set up a stick circuit for the BA relay as follows: from ground, through the LQ5 (Fig. 2g) contacts, through the A1 contacts, through AG5 contacts in the position shown, through the contacts 358, thence via wire 718 (Figs. 2g–2f), through the BA1 contacts, through the BA relay coil, through the resistance #2, to line 301. Opening of the BA2 contacts prevents the completion of a circuit from line 718 (Fig. 2g) to and through the punch selecting magnets 353 by the reading strip 622a, 623a. Closure of relay contacts BA3 then completes the circuit through the selected punch selecting magnets 353 by the common strip 622 and brush 623 at the third column position to punch the third digit of the product in the manner previously described. Thus, after punching the first two holes in the card, the first hole punched in the card is checked with the standing of the brush of the LQ readout in the corresponding order before the third hole can be punched in the card. The above operations are repeated after each column is punched.

After the last order of the product amount has been punched in the card, the P9 contacts close by the arrangement shown in Figs. 15-17 and the checking circuit is completed for the final two orders to effect checking of the holes in the last two columns punched in the card in the following manner. The spacing of the punch carriage for these two columns is effected upon energization of the BA relay coil, which is energized in the usual way when the tens column position is reached by brush 623a, by a circuit completed as follows: from ground, through the LQ5 contacts (Fig. 2g), through the A1 contacts, through the AG5 contact in the position shown, through the contacts 358, thence via line 718 (see also Fig. 2f), through the BA1 contacts now closed, thence through the P9 contacts, thence via line 719, to and through the punch magnet 360, to line 301. Energization of the punch magnet 360 only causes the rock shaft of the escapement mechanism of the punching machine to be operated and spaces the card carriage one space to the units column position. However, no hole is punched in the card due to the fact that contacts BA2 are open so that the 353 punch selecting magnets are not energized. The punched hole at the units position is now checked.

After the hole in the units order of the product amount has been verified, the card carriage is automatically skipped to the extreme left hand position under control of the skip bar 616 (Fig. 10) in the usual manner. In order to check the last column, it will be understood that the usual skip bar in the punch must be cut out so as not to control skipping until the last column has been checked. When the card carriage reaches its extreme left position, the punched and verified card is ejected in the usual manner. Contacts P5 are closed at the last column position, thus completing a circuit through the B relay in the manner previously described. Relay contacts B1 (Fig. 2b) close to energize the card eject magnet 361 (Fig. 10) to eject the punched card in a well known manner.

During the cycle in which the MP accumulator was reset, which is the cycle in which punching is initiated, contacts MP3 (Fig. 2c) are opened which tend to open the stick circuit for the JJ relay. This is effected when shunt cam contacts CC18 open, thus deenergizing the JJ relay. Also during this cycle, the MP2 relay contacts (Fig. 2b) are closed, and when cam contacts CC20 close, the circuit is completed to the E relay coil as follows: from line 301, through cam contacts CC20, through relay contacts MP2, through the E relay coil, to ground. Energization of the E relay sets up a stick circuit for itself back through the E1 contact, through card feed cam contacts FC2 now closed, to line 301. The closing of the E2 contacts permits a circuit to be again completed in the manner previously described to the card feed clutch magnet 304, and the XC cam shaft clutch control magnet 312 when cam contacts CC29 close, thus initiating card feed operations to thus feed the next card to be computed and checked into the pre-sensing position, and thereafter machine operations take place as has been previously described in detail.

After the next card has been fed down to the card carriage of the card punching mechanism, an LQ reset is initiated in the manner previously explained. During the LQ reset, the LQ5 contacts (Fig. 2g) are opened and when shunt cam contacts CC19 open in this cycle, the stick circuit for the A and the AB relay coils is opened, thus allowing the A and the AB relays to deenergize.

*Error designation*

If the product derived had been found to be in error, either the RDR or PQR readouts would not be at zero, and one or more of the CQ1 or CD1 contacts (Fig. 2k) would be closed so that a circuit would have been completed through the AG relay coil instead of the A relay coil upon closure of cam contacts CC47, and this circuit is described as follows: from ground, through cam contacts CC47, through relay contacts AN4 now closed, through the transferred CQ1 or CD1 contacts of the associated CQ or CD relay which was not energized because the corresponding brush of the PQ or RD readout was not at the zero position, through the AG relay coil, to line 301. Energization of the AG relay coil sets up a stick circuit for itself back through contacts AG1, through the manually operated contacts 721, to ground. The energization of the AG relay causes contacts AG2 (Fig. 2g) to close, contacts AG4 (Fig. 2b) to open, and contacts AG3 (Fig. 2c) to open.

The closure of AG2 contacts completes a circuit to the punch magnet 360 which effects an auto space circuit as follows: from line 301, through the punch magnet 360, through the AG2 contacts, through 358 contacts, through transferred AG5 contacts, to ground. This auto spacing circuit functions to cause the card carriage to be spaced column by column without punching the product amount on the card. After the card has been spaced to the left by the number of columns of the field reserved for recording the product amount, the card is automatically skipped to the extreme left hand position by means of the skip bar 316 to close contacts P5, in the manner previously explained.

The opening of the AG4 contacts (Fig. 2b) prevents the energization of the B relay upon closure of contacts P5, thus preventing the machine from going into its next computing operation for the following card, and enabling the card which has been found to be in error to be examined to determine the reason for the error.

The opening of the AG3 contacts (Fig. 2c) opens the holding circuit for the AL relay coil thus allowing the AL relay to deenergize upon completion of the checking operation, if the product amount is found to be in error. The A4 contact normally causes this relay to deenergize when the product amount has been found to be correct.

Another error designation would be the detection of improper punching, that is to say, the punching machine would not have punched a column to represent a digit corresponding to the standing of the brush in the LQR readout in a corresponding order. Obviously, the improper punching would also be the failure of the operation of the punching machine to punch this digit.

It will be understood that the relay coil BA will become energized only when the amount standing on a given order of LQR corresponds to the amount previously punched and sensed by the sensing means 650—651. With the BA relay coil energized in this manner, relay contacts BA3 close and permit another punching operation, pertaining to the next column. This operation will continue until the complete product is punched, provided there is no interruption of the circuit controlling punching, due to possible improper perforation of the recording on the card, or the failure to record on the card. It will also be recalled that when any card reaches the last column position in the punch, the last column contacts P5 (Fig. 10) are closed which brings about the energization of the eject magnet 361 (Fig. 10) to cause ejection of the card from the punch in the manner which is usual and well known for the punching machine shown herein.

Assuming the improper conditions just described, the relay coil BA does not become energized, and further punching is immediately terminated and the card remains in the punch. This is due to the fact that the circuit is not completed to the BA relay coil (Fig. 2f) and since the latter does not become energized, the relay contacts BA3 remain open and no punching will ensue and therefore the card remains in the punch. With the card so remaining in the punch, it does not reach the last column position; accordingly the last column contacts P5 (Fig. 2b) do not reclose and there is no energization of the relay coil B at this time, thus preventing the machine from going into its next computing operation for the following card and enabling the card which has been found to be punched in error to be examined. Thus, further checking operations will be terminated and the operator is then compelled to release the incorrect card by hand. This is effected by depressing the release key of the punching machine which will cause the card carriage to be skipped to the last column position and the card ejected in the usual manner.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. In a combined multiplying and dividing machine provided with a record controlled multiplying mechanism for multiplying multiplier and multiplicand factors on a record and with a dividing mechanism operable thereafter to divide the computed product as a dividend by said multiplier factor as a divisor and with means for automatically initiating the operation of said dividing mechanism upon completion of multiplying computation for the digits of the multiplier, said dividing mechanism including quotient receiving means, dividend receiving means, and divisor receiving means for receiving the multiplier factor, the last two named means controlling said dividing mechanism, and said multiplying mechanism including multiplier and multiplicand receiving means for controlling the latter, product receiving means, and means whereby the computed product in said product receiving means is transferred to the dividend receiving means at the termination of the multiplying computation, the combination of means set up in accordance with the number of digits of the multiplicand factor data, record controlled means for entering the multiplier factor in said divisor receiving means and in said multiplier receiving means, and the multiplicand factor in said multiplicand factor receiving means, other record controlled means operable prior to the multiplying computation to set said setup means to represent the number of digits of the multiplicand, means to retain the setting of said setup means during the multiplying computation and for the extent of the dividing computation during which the number of quotient digits are computed, means for terminating the operation of said dividing mechanism, and means controlled by said setup means and operable during the dividing computation to cause the operation of the means for terminating the operation of the dividing mechanism after a number of quotient digits has been computed and entered in the quotient receiving means corresponding to the number of digits of the multiplicand factor.

2. In a combined multiplying and dividing machine provided with a record controlled multiplying mechanism for multiplying multiplier and multiplicand factors on a record and with a dividing mechanism to divide as a dividend the computed product by one of said factors as a divisor and with means for automatically initiating the operation of said dividing mechanism upon completion of multiplying computation for the digits of the multiplier, said dividing mechanism including quotient receiving means, dividend receiving means, divisor receiving means for receiving the multiplier factor, the last two named means controlling said dividing mechanism, and said multiplying mechanism including multiplier and multiplicand receiving means for controlling the latter, and product receiving means from which the computed product is transferred to the dividend receiving means prior to the computation of division, the combination of supplemental multiplicand receiving means, means set up in accordance with the number of digits of the multiplicand factor data, record controlled means for entering the multiplier factor data in said divisor receiving means and in said multiplier receiving means, other record controlled means for concurrently entering the multiplicand factor in said multiplicand factor receiving means and in said supplemental multiplicand receiving means, other record controlled means to set said setup means to represent the number of digits of the multiplicand represented on the record, means to retain the setting of said setup means during the multiplying computation and for the extent of the dividing computation during which the number of quotient digits are computed, means for terminating the operation of said dividing mechanism, means controlled by said setup means and operable during the dividing computation to cause the operation of the means for terminating the operation of the dividing mechanism after a number of quotient digits have been computed and entered in the quotient receiving means corresponding to the number of digits of the multiplicand factor, and means for determining whether the quotient digits entered in the quotient receiving means correspond to the digits of the multiplicand entered in the supplemental multiplicand receiving means.

3. In a record controlled multiplying and dividing machine provided with a record controlled multiplier and multiplicand receiving means, multiplying mechanism controlled thereby for multiplying the multiplier and multiplicand factors on a record and accumulating the product in a product receiving means, a dividing mechanism controlled by a dividend receiving means and a divisor receiving means to divide the computed product as a dividend by said multiplier factor as a divisor and including a quotient receiving means, and means for automatically transferring the computed product from said product receiving means to said dividend receiving means while retaining the product amount on said product receiving means, recording means for recording the product under control of said product receiving means following the dividing computation, the combination of supplemental multiplicand receiving means, means set up in accordance with the number of digits of the multiplicand factor data, record controlled means operable prior to the multiplying computation to enter the multiplier factor data in said divisor receiving means and in said multiplier receiving means, record controlled means for entering the multiplicand factor in said multiplicand receiving means and concurrently in said supplemental multiplicand receiving means, other record controlled means to set said setup means to represent the number of digits of the multiplicand, means for terminating the operation of the dividing mechanism, means controlled by said setup means and operable during the dividing computation to cause the operation of the means for terminating the operation of the dividing mechanism after a number of quotient digits have been computed and entered in the quotient receiving means corresponding to the number of digits of the multiplicand factor, means for determining whether the computed quotient digits represented on the quotient receiving means corresponds to the digits in said supplemental multiplicand receiving means, and means controlled by said determining means to control said recording means to suppress recording when lack of correspondence is determined, and for initiating result recording upon correspondence in all digital orders.

4. The machine according to claim 3 in which there is further included, means to sense the product receiving means for determination of the number of digits of the computed product and entry shift means controlled thereby for controlling the entries effected by aforesaid product transfer means to cause the product amount to be entered in the higher orders of said dividend receiving means, further means for sensing the record for determining the number of digits of the multiplicand amount on the record and supplemental entry shift means controlled thereby, said supplemental entry shift means controlling the record controlled entering means for the supplemental multiplicand receiving means to cause the entry of the multiplicand in orders thereof which correspond to the orders of the quotient receiving means receiving like quotient digits.

JAMES W. BRYCE.